United States Patent
Brannan

(10) Patent No.: US 10,165,902 B2
(45) Date of Patent: *Jan. 1, 2019

(54) DECORATIVE REFLECTIVE STOPPER COVER

(71) Applicant: Ann B. Brannan, Town & Country, MO (US)

(72) Inventor: Ann B. Brannan, Town & Country, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,901

(22) Filed: Jul. 17, 2017

(65) Prior Publication Data

US 2018/0000293 A1 Jan. 4, 2018

Related U.S. Application Data

(63) Continuation-in-part of application No. 14/928,397, filed on Oct. 30, 2015, now Pat. No. 9,706,881, which is a continuation-in-part of application No. 14/212,101, filed on Mar. 14, 2014, now Pat. No. 9,523,186, which is a continuation-in-part of application No. 13/973,753, filed on Aug. 22, 2013, now abandoned.

(60) Provisional application No. 61/790,888, filed on Mar. 15, 2013, provisional application No. 61/692,578, filed on Aug. 23, 2012.

(51) Int. Cl.
*A47K 1/14* (2006.01)
*G09F 23/00* (2006.01)
*B32B 7/06* (2006.01)
*B32B 7/12* (2006.01)
*G09F 23/06* (2006.01)
*E03C 1/22* (2006.01)

(52) U.S. Cl.
CPC .................. *A47K 1/14* (2013.01); *B32B 7/06* (2013.01); *B32B 7/12* (2013.01); *G09F 23/00* (2013.01); *G09F 23/06* (2013.01); *B32B 2307/41* (2013.01); *B32B 2307/412* (2013.01); *B32B 2309/105* (2013.01); *B32B 2451/00* (2013.01); *E03C 1/22* (2013.01)

(58) Field of Classification Search
CPC ....................................................... A47K 1/14
USPC ...................................................... 4/286-295
See application file for complete search history.

(56) References Cited

U.S. PATENT DOCUMENTS 9,706,881 B1 * 7/2017 Brannan .................. A47K 1/04

* cited by examiner

*Primary Examiner* — Lori Baker
(74) *Attorney, Agent, or Firm* — Charles McCloskey

(57) ABSTRACT

A decorative reflective stopper cover has a flat, round, disc like shape. The disc has a top surface of a constant radius and an opposite bottom surface beneath. The top surface has an outer edge generally upon its perimeter and visible to users. The outer edge spans from the top surface to the bottom surface and denotes the maximum radius of the invention. The outer edge has a perpendicular orientation to the top surface and the bottom surface. The disc has multiple layers with a smooth transparent layer at the top surface upon an ink layer and then below that a substrate with an adhesive layer where the adhesive releasably connects to a sink surface. The transparent layer has a high gloss. Alternatively, the adhesive layer has a concave shape and the release layer has grooves upon it.

20 Claims, 14 Drawing Sheets

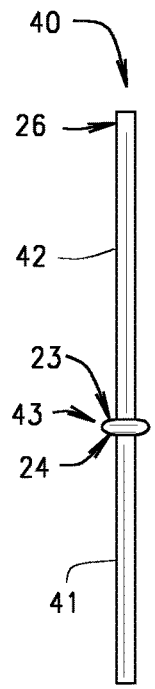
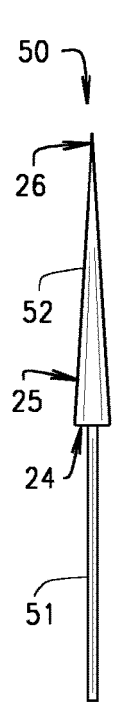
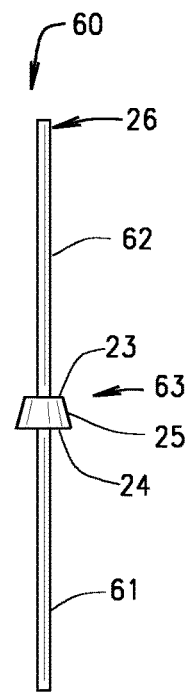
FIG. 9A  FIG. 9B  FIG. 9C
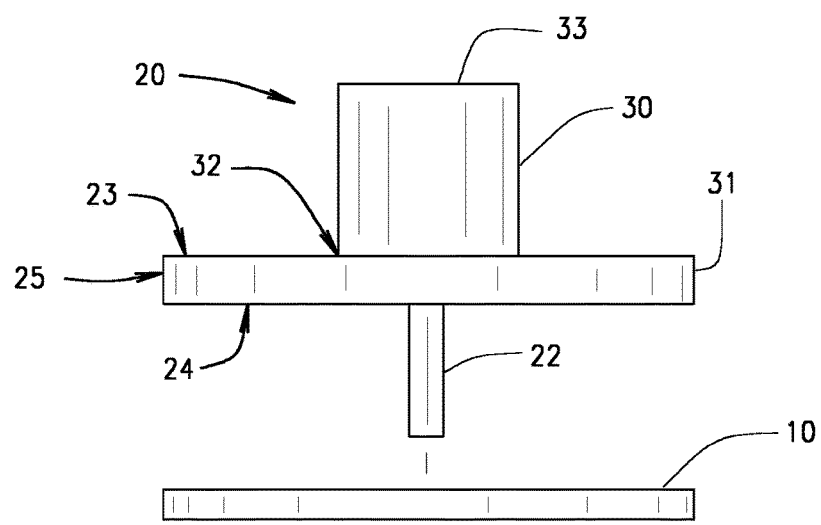
FIG. 11

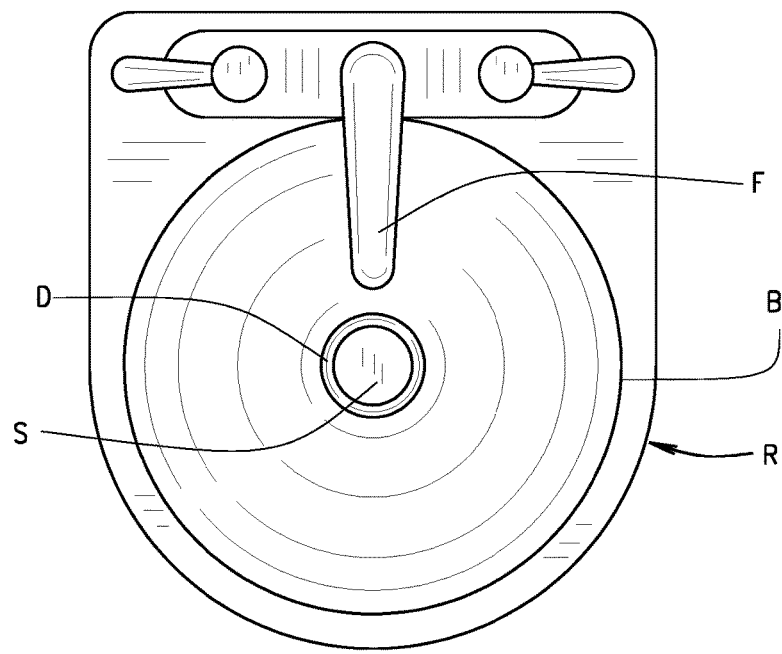
FIG. 17
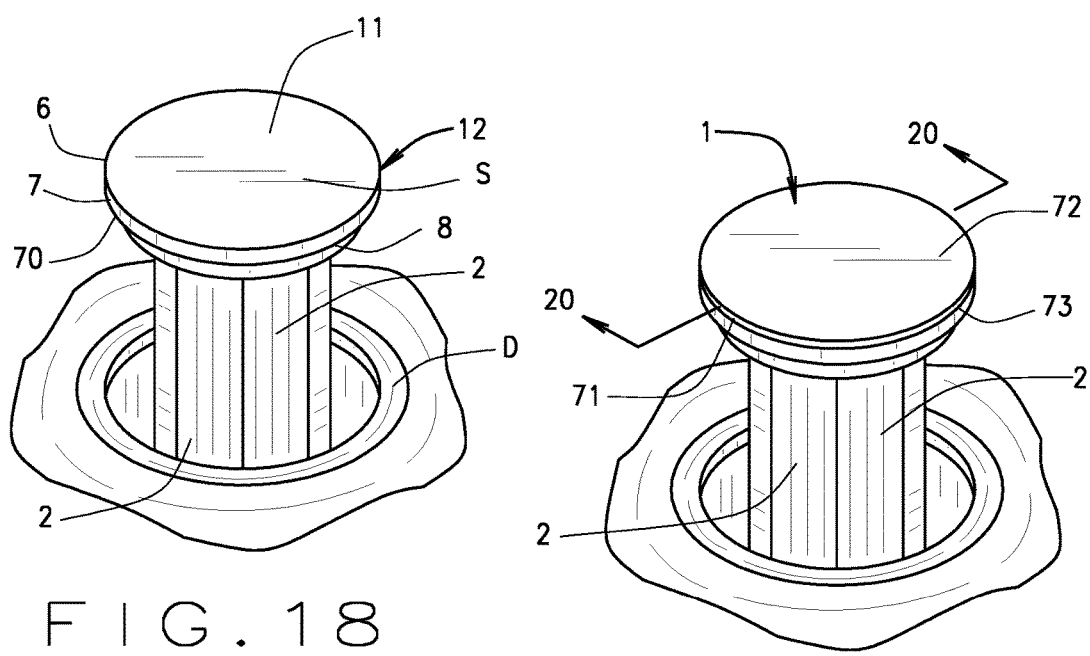
FIG. 18
FIG. 19

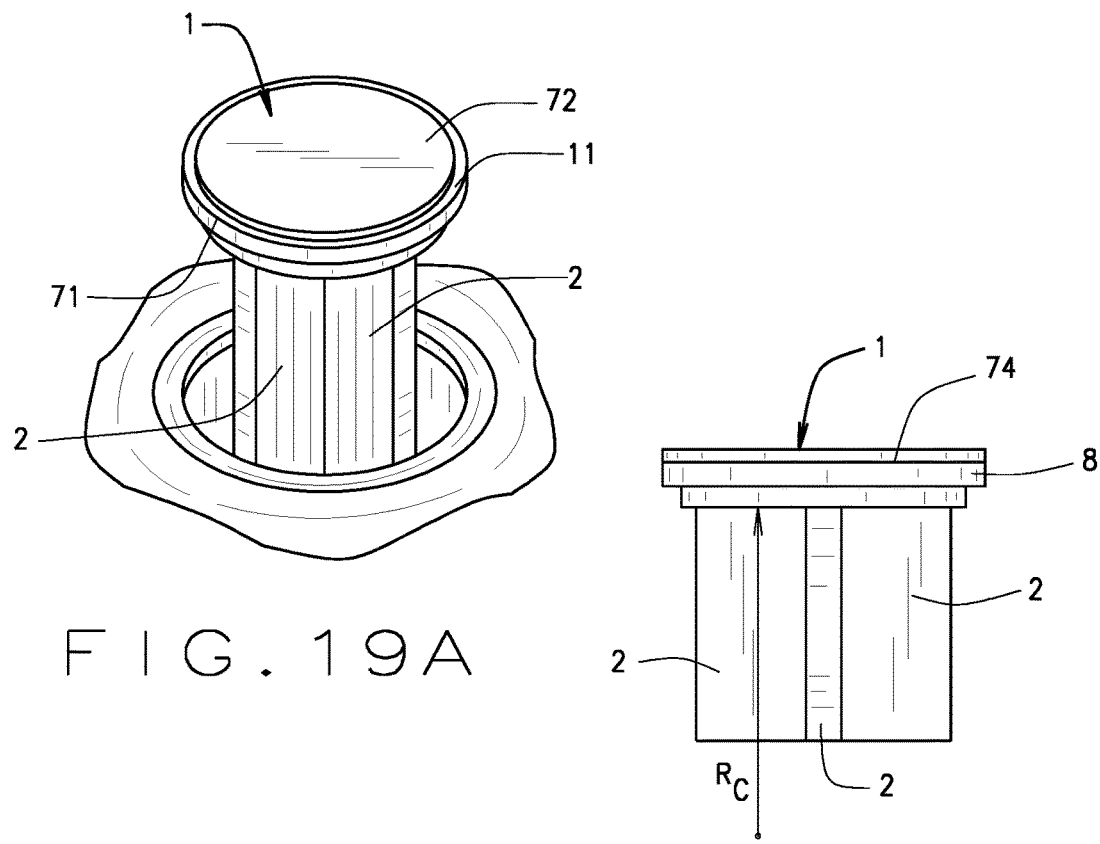
FIG. 19A
FIG. 21
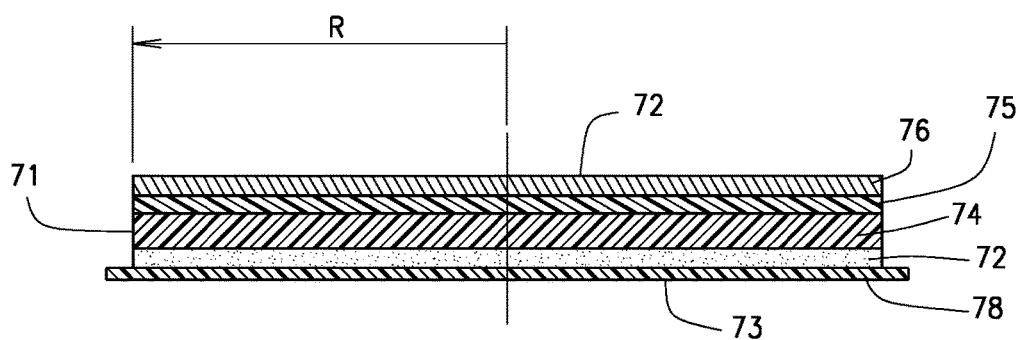
FIG. 20

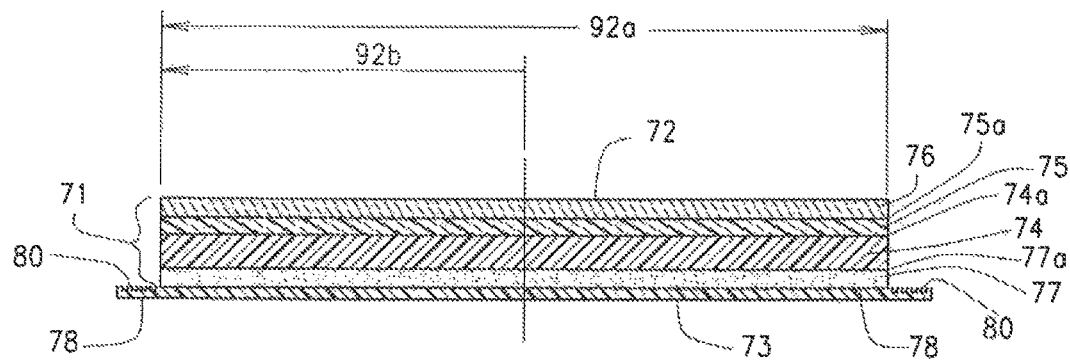
F I G . 3 1
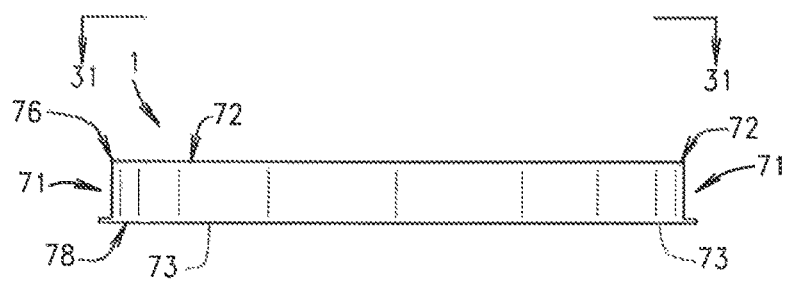
F I G . 3 2
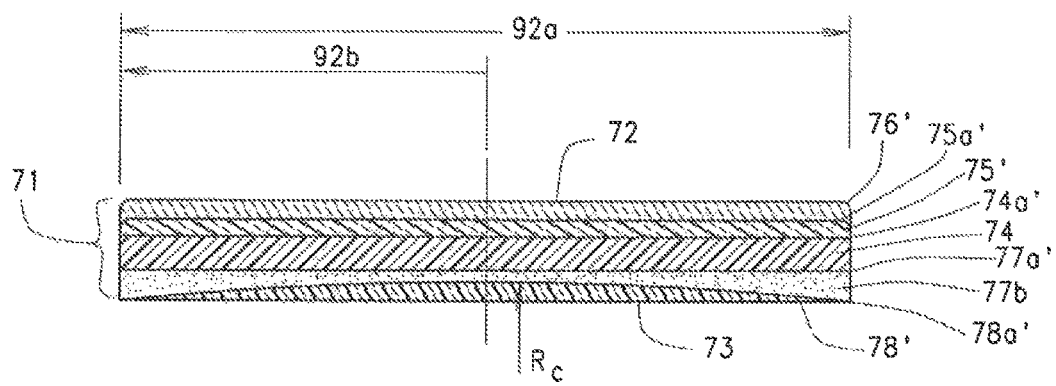
F I G . 3 3

DECORATIVE REFLECTIVE STOPPER COVER

CROSS-REFERENCE TO RELATED APPLICATION

This continuation in part application claims priority to pending non-provisional application Ser. No. 14/928,397 filed on Oct. 30, 2015 which claims priority to pending non-provisional application Ser. No. 14/212,101 filed on Mar. 14, 2014 which claims priority to provisional application No. 61/790,888 filed on Mar. 15, 2013 and to pending non provisional application Ser. No. 13/973,753 filed on Aug. 22, 2013 which claims priority to provisional application 61/692,578 filed on Aug. 23, 2012, all of which are owned by the same inventor.

BACKGROUND OF THE INVENTION

The decorative reflective stopper cover generally relates to bathroom accoutrements and more specifically to a layered device placed upon a cap of a sink stopper visible to a user of the sink. More particularly, the invention attaches a stacked, curved combination of round layers for placement centered upon a cap of a sink stopper so that a user has a pleasing view of the stopper. People use sinks in many places at work, at home, when travelling, and elsewhere. Sinks allow for delivery of water in a convenient location without the water running over the location, excepting a drain blockage. Sinks can be in a bathroom, a kitchen, a laundry room, a wet bar, an entertainment room, an entertainment area, and the like. In those locations, people may use water to perform various functions as commonly known.

Some sinks though may see less use than others. In homes, select bathrooms may remain in a heightened state of preparedness for guests or other visitors. In other homes, the homeowner may select a bathroom for heightened decoration because of personal preference. In other locations, the sink may see little use as people rarely visit the location. Public areas, such as hotels, convention centers, airport terminals, restaurants, and the like, also have sinks. These preceding sinks provide the opportunity for decorating each sink and its surroundings.

People enjoy many items as decorations. Painting and wall paper may decorate a room, such as a bathroom, to make it a bright and inviting place. Plants and sculptures break up the linear outlines in a bathroom and bring an element of the natural into the room. Even with those decorations, the humble sink retains its functional use for delivering and collecting water.

Over the years, sinks have received some decoration through coloration and pigments added to the constituents of the sink material. These forms of decoration occur at the time of manufacturing and remain through the life of the sink. Very rarely do people add decorations to a sink as those decorations must resist the intermittent or occasional use of the sink. At the bottom of the sink, the drain stands ready to release any collected water into the wastewater system. The drain may have a closure from a stopper as desired by the homeowner or other person using the sink. Most drains have their closures last for a short time or on an intermittent basis. Opening and closing a drain with a stopper involves raising and lowering the stopper using levers and pivoting rods as presently done. Because stoppers move and drains encounter water and other substances placed into them, decorating of drains and stoppers has lagged far behind the rest of the decorations in a bathroom or other setting.

People enjoy many kinds of advertisements. Advertisers also produce advertising in many creative ways. People also tire of advertisements after a time which spurs advertising companies to create new ads. Advertisements placed near sink drains also require changing from time to time. Advertisements near drains would break up the functional and boring appearance of a drain, perhaps to the delight of the user. Even with those advertisements, the humble sink drain retains its functional use discharging water from the sink into the wastewater system, unimpeded.

Meanwhile, sinks and their drains, particularly in public areas, have developed into a pleasing though rugged appearance. The sinks generally have a nearly flat bottom with the drain towards the center of the bottom. The drain often has a planar form with nineteen holes through it in a three, four, five, four, three pattern arranged in a compact hexagon. The nineteen hole pattern occupies the center of the drain with a solid border outside of the holes to the edge of the drain. The nineteen hole pattern appears often in bathrooms however other hole patterns may exist. Because drains encounter water and other substances placed into them, along with various forms of abuse, placement of advertisements on drains has lagged far behind the rest of the decorations in a bathroom or other setting.

DESCRIPTION OF THE PRIOR ART

Over the years, plumbers, metal fabricators, decorators, interior designers, and homeowners have sought to improve the look and appearance of sink stoppers. Sink stoppers and adjacent drains remain elusive in their willingness to accept decorations. Sink stoppers have a long history going back to at least the U.S. patent of Nystrom, U.S. Pat. No. 2,169,006. The U.S. patent to Shames, No. D248,133 also has sink stopper in its title. The round stopper has a planar shape with a protrusion partially along one radius, shown like eastward.

The publication to Geller, No. 2006/0090257, provides a drain surrounding cover. The cover, 30, has a top, a bottom, an inner edge, and an outer edge. The inner edge has a diameter similar to the outer diameter of a drain ring 12 installed into a sink. The cover may have various designs, see FIGS. 6, 7, but also has an adhesive backing, see FIG. 4, for securement to the drain ring. As shown in FIG. 5, the cover protects the outer rim of a drain ring, and perhaps adjacent edges of the sink bottom. The cover though retains its center opening for passage of water but does not secure to a stopper.

Then the U.S. Pat. No. 6,691,411 to Ball shows a cover 40 in FIG. 3 with the cover 40 tilted towards the reader and attaining an elliptical form. The present invention lacks an elliptical form but rather has a round form. Ball also has its cover finished and frictionally engaging a flange. The present invention though does not show a finish and does not frictionally engage another surface. Moreover, the present invention has one surface suitable for printing, such as images, photographs, drawings, messages, and the like, and the opposite surface suitable for an adhesive.

Over the years, bathtubs have received adhesive letters, animals, other decorations and grip enhancing strips, flowers, and the like. These decorations and grip enhancers have a generally planar form and an adhesive that permanently bonds them to the bathtub. Removal of these decorations and grip enhancers from a bathtub generally destroys them and leaves some residue upon the bathtub. Often, these decorations and grip enhancers have a grid like surface that allows for accumulation of soap scum and other debris over the years.

Various labels and sheets have adhesive backing upon them. The adhesives secure the labels and sheets to paper and paper related surfaces. The adhesives bind the texture of the labels and the sheets to the surface and often prevent removal of them from it. Vinyl lettering and sheeting also may have adhesives that bind them to smooth surfaces, typically metal or fiberglass. The vinyl lettering, designed to be seen, often has an upright position which also limits its exposure to rain and other liquids. Vinyl sheeting also has a common upright orientation as parade banners or for signage which again limit its exposure to rain and other solvents.

Covers now appear on various electronic devices for people such as cell phones and smart phones. The patent to Hegemier, U.S. Pat. No. 8,110,268, shows an adhesive cover for consumer devices. This cover has corona treatment of one layer and utilizes various methods of printing to provide an image upon another layer.

Over the years, venue operators, restaurateurs, hoteliers, sports franchises, transport authorities, governments, and the like have sought to improve the look and appearance of their bathrooms, sinks, and drains, and in some instances to raise a little revenue from them. Over the years, bathrooms and restrooms have had makeovers to brighten them and to install motion activated faucets and other dispensers. Select bathrooms have installed advertising panels, and in some cases computer screens, on the walls where seen by users of the bathrooms.

A well mannered user, after seeing the advertising panels, then moves to a sink and washes up. More and more sinks, especially in public restrooms, have motion activated faucets that make using the sinks easier and more convenient. Easier to use sinks attract more people. As more people wash up, they will casually glance at the drain during washing. In that glance, a person sees a typical drain, usually chrome, bland, and functional. Most people do not give a second thought to a drain. However, as people use sinks they do see the drain. Perhaps people's glances at a drain can be put to use.

Though the prior art includes various drain covers, labels, and decorations, the prior art has shown few instances of a cover applied in sheet form upon a stopper, often with a curved cap. The present invention overcomes the disadvantages of the prior art and provides a decorative cover that adheres to the top surface of a sink stopper cap to suit the aesthetic and decorating preferences of a homeowner while resisting the water and other substances introduced into a sink from time to time. The present invention also allows a homeowner to conceal worn, rusty, or otherwise damaged sink stoppers. The present invention provides a planar sheet like device that connects to an existing stopper top using minimal skill. The present invention accomplishes its goal of connecting a decorative object to a sink stopper using a variety of ways.

SUMMARY OF THE INVENTION

Generally, the decorative reflective stopper cover has a flat, round, disc like shape. The disc has a top surface of a constant radius and an opposite bottom surface beneath. The top surface has an outer edge generally upon its perimeter and visible to users. The outer edge spans from the top surface to the bottom surface and denotes the maximum radius of the invention. The outer edge attains a perpendicular orientation to the top surface and the bottom surface. The disc has a multiple layer construction with a smooth transparent layer at the top surface upon an ink layer and then below that a substrate with an adhesive layer where the adhesive releasably connects to a sink surface. The transparent layer has a high gloss.

There has thus been outlined, rather broadly, the more important features of the invention in order that the detailed description thereof that follows may be better understood and that the present contribution to the art may be better appreciated. The present invention also includes mutually parallel top and bottom surfaces, a ratio of the diameter of the disc to its thickness, ability to fit smoothly upon curved surfaces, interfaces between adjacent layers, concave adhesive layer with cooperating convex release layer, and grooves upon the release layer. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a planar ring for messages proximate a drain that places an advertisement readily near a drain.

Another object is to provide such a planar ring for messages proximate a drain that centers the advertisements upon a drain.

Another object is to provide such a planar ring for messages proximate a drain that fits upon a drain with multiple holes without impeding water flow.

Another object is to provide such a planar ring for messages proximate a drain that installs with a minimum of skilled labor.

Another object is to provide such a planar ring for messages proximate a drain that removes the advertisement without damaging the drain or adjacent sink.

Another object is to provide such a planar ring for messages proximate a drain that resists water, isopropyl alcohol, chlorine, and other substances that enter a sink.

Another object is to provide such a planar ring for messages proximate a drain that removes readily.

Another object is to provide such a planar ring for messages proximate a drain that maintains its printed image for at least two years.

Another object is to provide such a planar ring for messages proximate a drain that utilizes a printed image that does not bleed or fade.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 9a shows an alternate embodiment of the gage of the invention;

FIG. 9b shows an alternate embodiment of the gage of the invention;

FIG. 9c shows an alternate embodiment of the gage of the invention;

FIG. 11 provides a side view of the alternate embodiment of the invention;

FIG. 17 provides a top view of a sink with an existing stopper;

FIG. 18 shows a detailed view of an existing stopper;

FIG. 19 illustrates a perspective view of the invention installed upon a stopper;

FIG. 19a provides a perspective view of an alternate embodiment of the invention installed upon a stopper;

FIG. 20 shows a sectional view of the invention;

FIG. 21 illustrates a side view of an alternate embodiment invention installed upon a stopper having a top;

FIG. 31 provides a sectional view of the invention;

FIG. 32 describes a side view of the invention; and,

FIG. 33 provides a side view of a further alternate embodiment of the invention.

The same reference numerals refer to the same parts throughout the various figures.

DESCRIPTION OF THE PREFERRED EMBODIMENT

The present invention overcomes the prior art limitations by providing a planar ring for messages proximate a drain for communicating to those who use a sink or a basin, typically in a bathroom, restroom, and the like.

Figure 1:
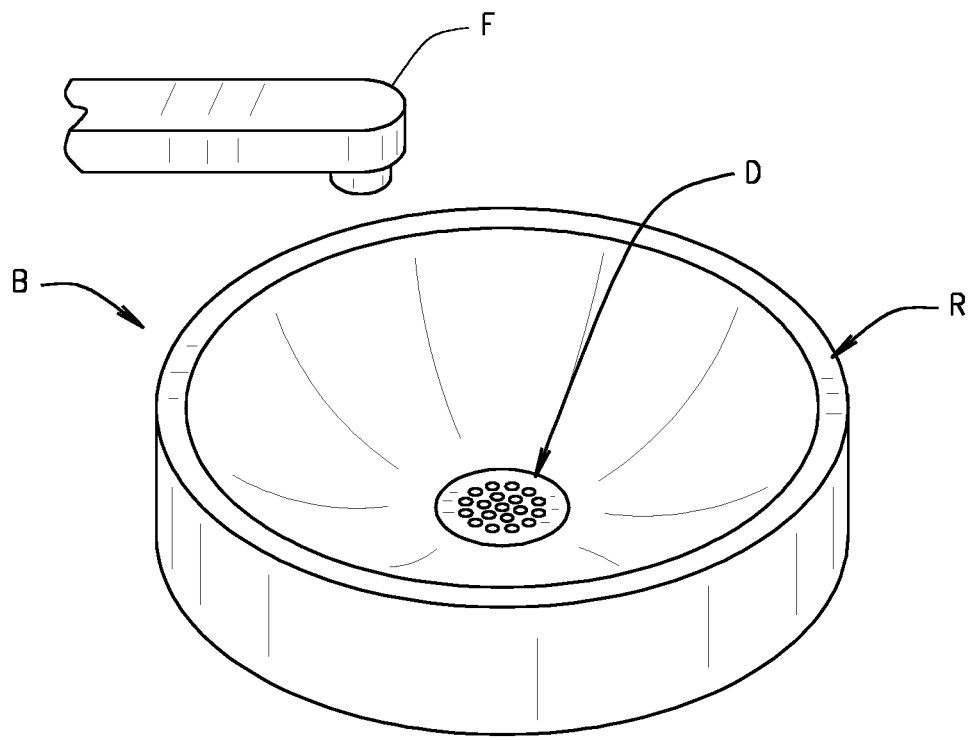
FIG. 1 provides a perspective view of a sink with a drain.

A sink can take many forms but an oval or a round shape appears often as shown in FIG. 1. The sink B has its rim R that generally abuts upon a top not shown. A faucet F extends into the sink as commonly seen. Inwardly from the rim, the sink drops downwardly below the plane of the top. The sink drops left to right and front to back forming a depression, or bowl like shape so that any fluids, powders, dusts, and solids placed into the sink move under gravity towards the bottom of the sink. The bottom of the sink has the lowest distance beneath the rim R and the adjacent top as is commonly seen. At the bottom, the sink has a drain D, typically with a plurality of holes. The drain appears as the uppermost portion of tubular hardware secured to the sink bowl that leads into the wastewater system, not shown. In some sinks, the bowl is nearly flat in the vicinity of the drain. Though FIG. 1 shows a classic sink, the Applicant foresees application of the alternate embodiment upon sinks of various shapes and curvatures and with drains of various sizes and hole patterns. Preferably, a user of the alternate embodiment has turned off water to the sink, or otherwise inactivated any motion sensors, and checked that the sink near the drain is dry prior to installation of the alternate embodiment. The description that follows in referring to the alternate embodiment upon a sink drain also applies to the alternate embodiment seeing use with floor and shower drains as well.

Figure 2:
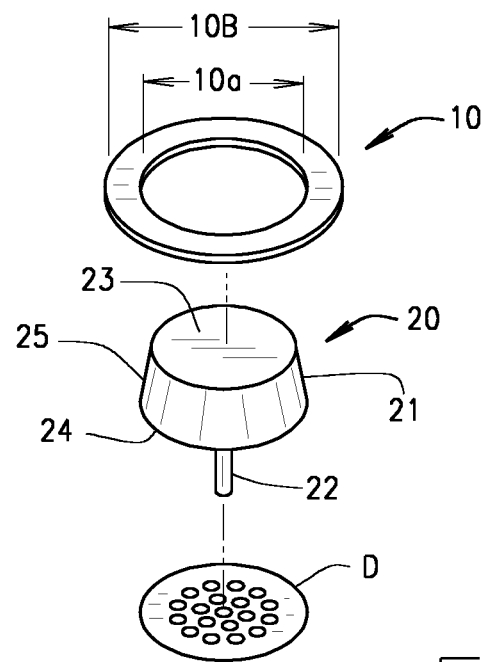
FIG. 2 shows an exploded view of components of an alternate embodiment the invention.

Turning to FIG. 2, the alternate embodiment appears in an exploded view above a drain D. The alternate embodiment includes an advertisement 10 here shown as a ring though the Applicant foresees other shapes for the advertisement, such as scalloped, serrated, zigzag, and the like. The other shapes will have a round aperture for usage with the alternate embodiment. This description proceeds with a ring, or annular shape, representing the other possible shapes for the advertisement component of the alternate embodiment. The advertisement 10 has an inner diameter 10a, and an outer diameter 10b that exceeds the inner diameter. The inner diameter is at least that of the outermost diameter of the hole pattern in a drain. The advertisement does not impede the draining of fluids and slurries through the drain. The outer diameter is at least that of the diameter of the drain itself, usually seen as a metal plate having the hole pattern. Beneath the ad 10 in this figure, the alternate embodiment has the gage 20 with its body 21, generally rounded, and its tip 22, centered and perpendicular to the body. The body has a top surface 23 and an opposite bottom surface 24 joined by a circumferential wall 25. Preferably, the round gage has a round top surface and a round bottom surface. In an alternate embodiment, the top surface has a slightly less diameter than the bottom surface resulting in the wall having a slight inward cant and the body having a truncated conical shape. The cant of the wall provides for mechanical centering of an ad 10 placed upon the gage during installation. The bottom surface has a diameter slightly less than the inner diameter of the ad 10. The diameter of the bottom surface also exceeds the diameter of a typical multiple hole pattern in a drain D. In an alternate embodiment, the diameter of the bottom surface exceeds the diameter of the drain D. In an alternate embodiment, the diameter of the top surface is the same as the diameter of the bottom surface making the circumferential wall perpendicular to both the top surface and the bottom surface, or a right cylinder. In a further alternate embodiment, the ad 10 and the top surface 23, bottom surface 24, or circumferential wall 25 each include a marking. The marking upon the ad and the marking upon either the top surface, bottom surface, or circumferential wall would guide a user to align the ad to the gage for a proper application of the ad upon the drain. The user would previously have oriented the marking upon the top surface, bottom surface, or circumferential wall towards the faucet of the sink or other preselected position. The marking may include a symbol, letter, triangle, boss, and the like that a user may see during before and during installation.

Figure 3:
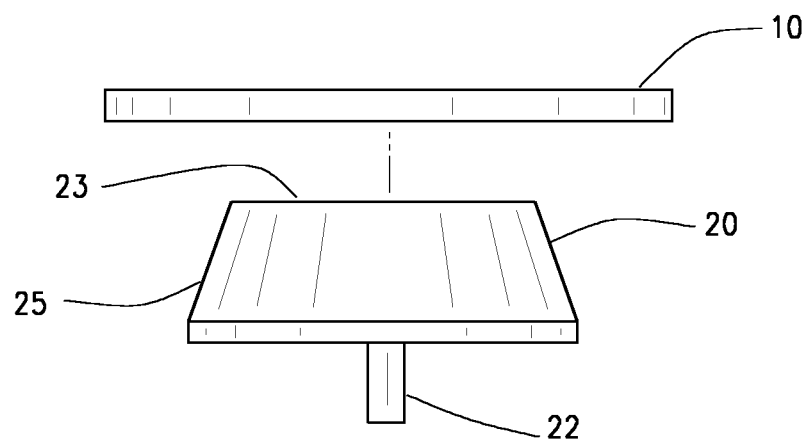
FIG. 3 shows a side view of an alternate embodiment of the invention.

Looking more closely, FIG. 3 provides a side view with the gage 20 placed upon the drain. The gage has its bottom surface adjacent to the drain and the tip 22 generally inserted into the center of the drain as shown. The wall 25 extends upwardly from the bottom surface and in this embodiment, the wall bevels inwardly as it climbs away from the bottom surface. Opposite the drain, the gage 20 has its top surface 23 visible to a user. The top surface, in this embodiment, has a slightly less diameter than the bottom surface. The top surface is now ready to receive the ad 10 in its annular shape. The inner diameter 10*a* of the ad 10 fits upon the top surface and then self centers as the ad passes down the wall 25.

Figure 4:
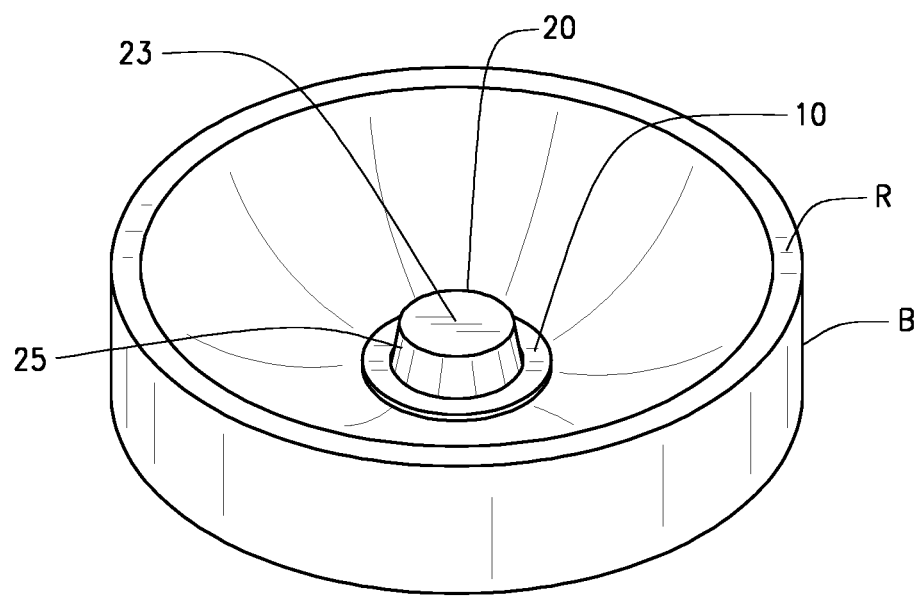
FIG. 4 shows a perspective view of an alternate embodiment of the invention upon a drain in a sink.

When the ad 10 passes down the entire wall 25, FIG. 4 shows the ad 10 placed upon the drain within the bowl B of a sink. The ad rests upon the drain and if wide enough, the ad extends upon the bowl of the sink outwardly from the drain. The gage 20 still extends upwardly from the drain and with its wall and top surface shown through the ad 10.

Figure 5:
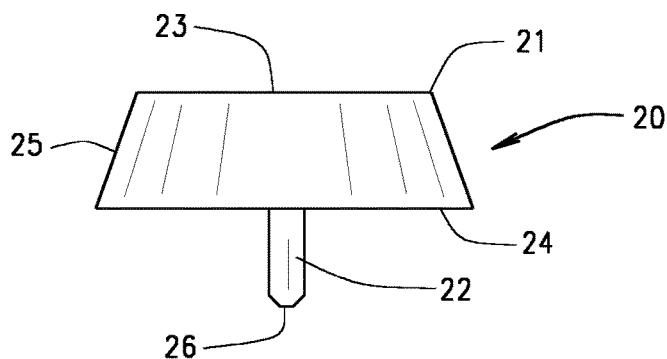
FIG. 5 illustrates a side view of a component of an alternate embodiment of the invention.

FIG. 5 shows a side view of the gage 20 alone. The gage has its generally rounded body 21 with the centered and perpendicular tip 22. The tip is preferably round in its cross section to fit into a drain hole however, the Applicant foresees other cross section shapes for specific drain hole geometries. The tip has a cylindrical shape in the alternate embodiment. The tip extends away from the bottom surface 24 and generally has a constant width. Outwardly from the bottom surface, the tip has its nose 26 upon an end so that the nose inserts first into a drain hole during usage of the alternate embodiment. As above, the top surface 23 is opposite the bottom surface and the circumferential wall 25 joins to both surfaces. Preferably, the gage is round with round top and bottom surfaces. Here, the top surface has a slightly less diameter than the bottom surface so the wall attains a beveled, or inwardly canted, edge as part of a truncated conical shape. The bevel, or cant, of the wall provides for mechanical centering of the ad 10 placed upon the gage during installation as shown in FIGS. 2-4. The bottom surface has its diameter slightly less than the inner diameter of the ad 10. In an alternate embodiment, the top surface has joining to it a removal device. The removal device allows a user to grip it and then remove the entire gage 20 from a drain without having to grip the circumferential wall 25 or the circumference of the bottom surface. The removal device is generally elongated and extends perpendicular to the top surface, generally opposite the tip 22. The removal device may have the form of a slender cylinder or rod, a hook, a loop, a knob, and the like.

Figure 6:
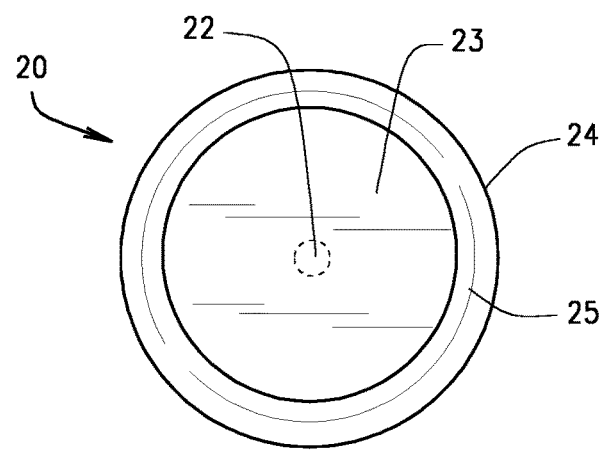
FIG. 6 provides a top view of the component of the alternate embodiment.

FIG. 6 shows a top view of the gage 20 with the body in the foreground and the tip 22 in the background and shown in phantom. In this view, the gage has its top surface 23 preferably round but of a slightly lesser diameter than the bottom surface 24. From the top surface to the bottom surface, the wall 25 extends outwardly, joining the two surfaces. The wall begins with its diameter being that of the top surface then it expands to that of the bottom surface. The gage has its tip generally centered upon the bottom surface of the body.

Figure 7:
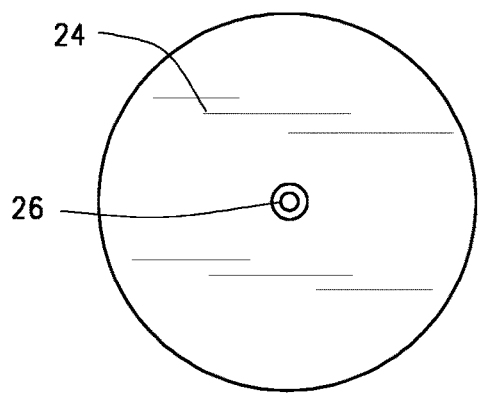
FIG. 7 provides a bottom view of the component of the alternate embodiment.

The tip 22 appears nose 26 first, that is, in the foreground of FIG. 7. FIG. 7 shows a bottom view of the gage but with the tip in the foreground and the body in the background. The tip has a width, here shown as a diameter, markedly less than the diameter of the bottom surface 24. The bottom surface has its generally round shape as previously described. In an alternate embodiment, the nose has a slightly lesser width than that of the remainder of the tip to ease its insertion into a hole of a drain D.

Figure 8:
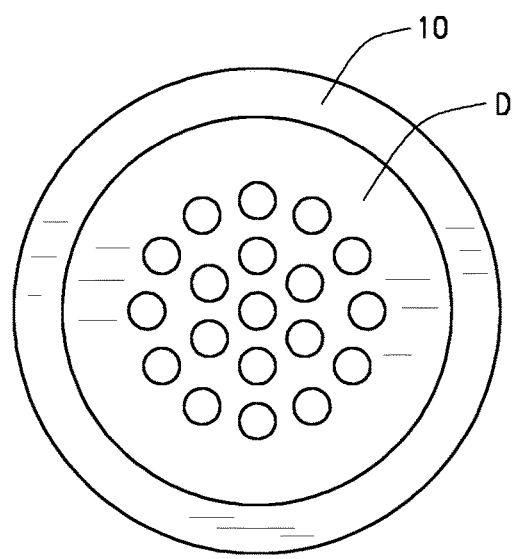
FIG. 8 shows a top view of a drain following application the alternate embodiment of the invention.

Upon removing the gage 20, the drain D has the ad 10 as shown in FIG. 8. The ad is generally centered upon the drain and outwardly from the holes so that drainage continues without interruption.

In a further alternate embodiment, the alternate embodiment utilizes a gage 20 having a tip 22 alone. The tip has the form of a hollow cylinder but with an enlargement along its length. The enlargement can be a deformation of the cylinder outwardly as from compression, a ring press fit upon the tip, or a bead molded into the tip. The enlargement is approximately midpoint along the length of the tip. During usage of the alternate embodiment, a user places this alternate gage near a drain D and inserts the tip into a hole of the drain pattern. The tip then advances into the hole until the enlargement comes to rest upon the drain. In this position, a portion of the tip remains above the drain, ready to receive a cooperating opening in an ad 10. For this embodiment, the ad may have a solid, planar, circular form or alternatively a rectangular form. The ad may include its own pattern of holes to cooperate with the drain.

In a further alternate embodiment, the gage has its tip but the tip has a generally hemispherical shape, similar to a button or a knob protruding from the bottom surface. The tip in this alternate embodiment has a diameter less than the distance or height between the top surface and the bottom surface. The tip here extends from the bottom surface but the gage has a generally short cylindrical shape, similar to a puck.

FIGS. 9*a*, 9*b*, 9*c* show three further alternate embodiments related to the tip 22, respectively. These embodiments, as at 40, 50, 60, deploy an advertisement 10 that has a plurality of holes in a planar material, but not a ring like shape as previously described. These alternate embodiments are generally slender and elongated with a maximum diameter that of one hole in the planar advertising material. From the left of the figure, alternate embodiment 40, shown at FIG. 9*a*, has a generally rod like form with an elongated tip 42 having a nose 26 towards the top of this figure and a shank 41 coaxial with the tip. Between the tip and the shank, this embodiment 40 has a centered disc 43 with a top surface 23 and a bottom surface 24 slightly spaced below the top surface. The centered disc 43 has its diameter slightly larger than a hole in a multiple hole drain and slightly less than a hole in the planar advertising material. The top surface 23 and the bottom surface 24 have the same diameter in this embodiment 40. The disc is generally centered along the combined length of the tip 42 and the shank 41. The shank may be incorporated into a handle or other means of assisting a user to grip the device during its usage. The tip and the shank have a diameter of about 1 mm to about 5 mm. In a further alternate embodiment, the rod like form with its tip 42 coaxial with the shank 41 has a bead substituted for the disc 43. The bead has a diameter of about 2 mm to about 7 mm.

The second alternate embodiment 50, shown at FIG. 9*b*, has a generally arrow like form with an elongated conical tip 52 having a pointed nose 26 towards the top of this figure and a shank 51 coaxial with the tip but opposite from the tip. The tip has its narrower portion, that is, the smallest diameter of a component of this embodiment. Opposite the pointed tip 26, this embodiment 50 has its wider portion of the tip, shown as the bottom surface 24. The bottom surface has a diameter visibly wider than that of the pointed tip of this embodiment. The cone shaped tip has its bottom surface 24 of a diameter slightly larger than a hole in a multiple hole drain and slightly less than a hole in the planar advertising material. The shank may be incorporated into a handle or other means of assisting a user to grip the device during its usage.

And the third alternate embodiment 60, shown at FIG. 9c, has a generally rod like form with a truncated conical portion 63 near the center of the embodiment 60. The truncated conical portion 63 has a top surface 23, an opposite bottom surface 24, and circumferential wall 25 similar to that previously described in relation to FIGS. 1-8. The truncated conical portion has its bottom surface slightly larger in diameter than a hole in a multiple hole drain and its top surface slightly less in diameter than a hole in the planar advertising material. The truncated conical portion has its own length much less than the length of the remaining rod. The truncated conical portion has its position between a tip 62 and a shank 61 as shown, generally midway along the embodiment. The shank may be incorporated into a handle or other means of assisting a user to grip the device during its usage.

In use, a device would incorporate any of these three alternate embodiments into a handle for usage upon a drain with the tip 42, 52, 62 inserting into one drain hole and then the widest portion of the disc 43, cone 53, or truncated cone 63 abutting the drain. A user then places the advertisement 10 upon the tip 42, 62 or narrow tip 52 of the cone and the rod or narrow tip enters one hole of the advertisement as the user slips the advertisement downwardly towards the drain. With the advertisement in place, the user lifts the shank 41, 51, 61 upwardly from the drain.

Figure 10:
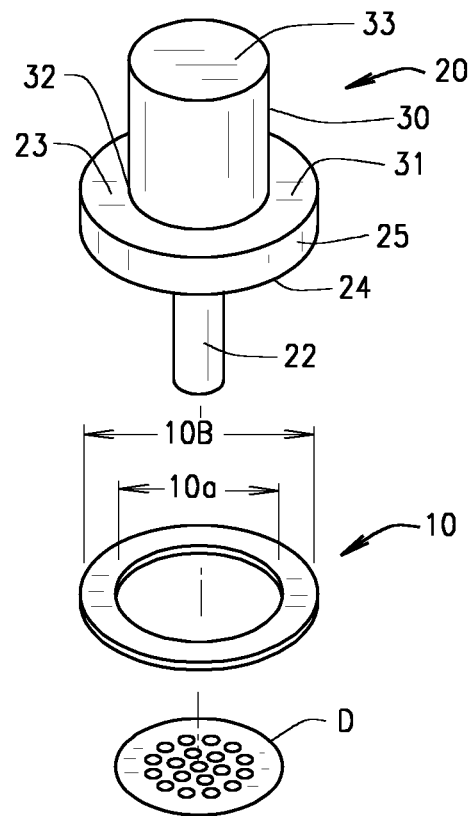
FIG. 10 illustrates an exploded view of components of the alternate embodiment the invention.

Turning to FIG. 10, an alternate embodiment of the alternate embodiment appears in an exploded view above the drain D. As before the alternate embodiment includes an advertisement 10 here shown as a ring beneath the gage 20 though the Applicant foresees other shapes for the advertisement, such as scalloped, serrated, zigzag, and the like. The other shapes will have a round aperture for usage with the alternate embodiment. This description proceeds with a ring, or annular shape, representing the other possible shapes for the advertisement component of the alternate embodiment. The advertisement 10 has its inner diameter 10a, and an outer diameter 10b greater than the inner diameter. The inner diameter is at least that of the outermost diameter of the hole pattern in a drain. The advertisement does not impede the operation of the drain. The outer diameter is at least that of the diameter of the drain itself, usually seen as a metal plate having the hole pattern. Beneath the ad 10 in this figure, the alternate embodiment has the gage 20 with its handle 30 merged with a base 31 at a juncture 32, generally rounded, and its tip 22, centered and perpendicular to the base and opposite the handle. The handle has a generally cylindrical form and a top 33 generally oriented towards a user during usage of the alternate embodiment. The base 31 has its top surface 23 and the opposite bottom surface 24 joined by a circumferential wall 25 as before. The top surface and the bottom surface are mutually parallel. However, the top surface and the bottom surface have the same diameter and a slight spacing apart, or a thickness, thus forming the base into a disc like shape as shown. The spacing between the top surface and the bottom surface provides the circumferential wall 25 that fits within the inner diameter 10a of the advertisement 10. Alternatively, the base rests upon a planar advertisement while the tip 22 fits into a hole through the advertisement. The tip has its slender and elongated form as shown. The diameter of the bottom surface also exceeds the diameter of a typical multiple hole pattern in a drain D. In an alternate embodiment, the diameter of the bottom surface exceeds the diameter of the drain D. For a further alternate embodiment, the ad 10 and the top surface 23, bottom surface 24, or to circumferential wall 25 each include a marking. The marking upon the ad and the marking upon either the top surface, the bottom surface, or the circumferential wall would guide a user to align the ad to the gage for a proper application of the ad upon the drain. The user would previously have oriented the marking upon the top surface, bottom surface, or circumferential wall towards the faucet of the sink or other preselected position. The marking may include a symbol, letter, triangle, boss, and the like that a user may see during before and during installation.

Moving from FIG. 10, FIG. 11 provides a side view with the gage 20 ready for placement upon the ad 10 and then upon the drain D previously shown. The gage has its top 33 oriented away from the drain and the ad 10, its base 31 towards the ad, and its tip 22 generally centered upon the ad and positioned to subsequently insert through the ad and into the drain D and the centerline shown. The base has its diameter generally exceeding that of the handle 30 and fitting within the inner diameter of the ad as previously shown. The wall 25 extends upwardly from the bottom surface and in this embodiment, the wall has a generally square orientation to the bottom surface 23 and the top surface 24, that is, the wall has no bevel in contrast to the previous embodiments. The top surface 23 remains visible to a user during usage. As before, the top surface is now ready to receive the ad 10 in its annular shape. The inner diameter 10a of the ad 10 fits upon the top surface and then self centers as the ad passes down the wall 25.

Figure 12:
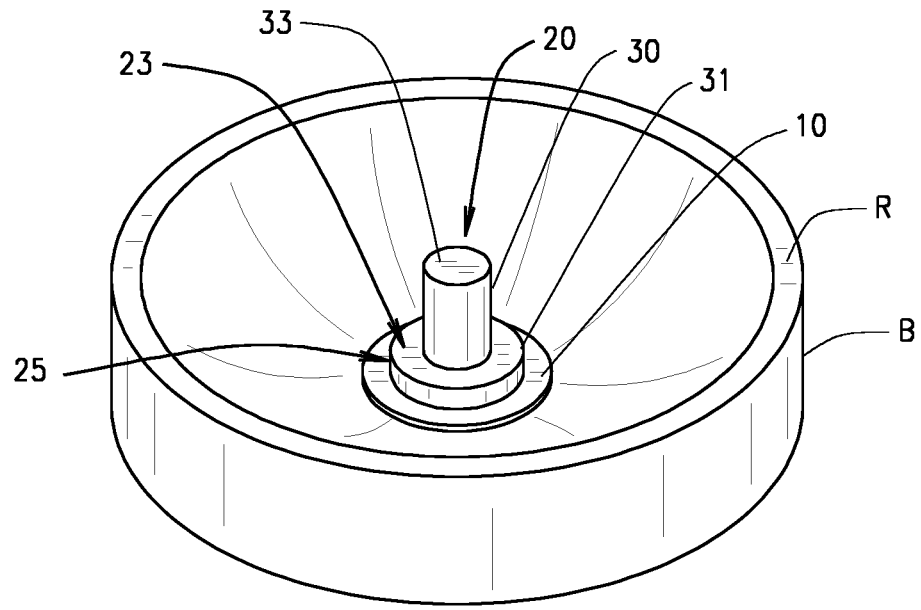
FIG. 12 shows a perspective view of the alternate embodiment of the invention upon a drain in a sink.

When the ad 10 adjoins the entire wall 25 or the base 31 rests upon the ad 10, FIG. 12 illustrates the ad 10 placed upon the drain D within the bowl B of a sink. The ad rests upon the drain and if wide enough, the ad extends upon the collar outwardly of the drain and even to the bowl of the sink outwardly from that. The gage 20 still extends upwardly from the drain. The handle 30 extends upwardly from the drain and the top surface 23 of the base 31 can be seen during usage.

Figure 13:
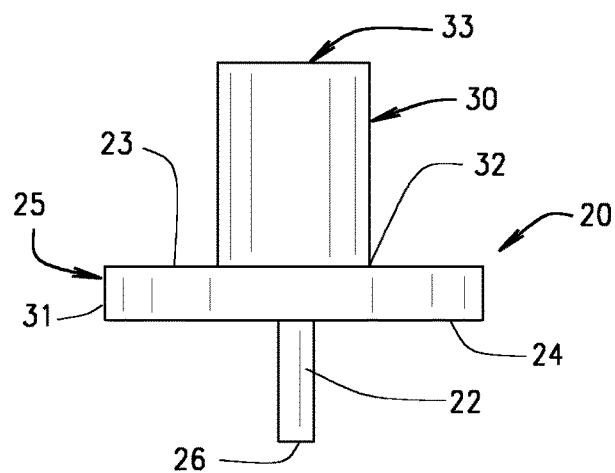
FIG. 13 provides a side view of a component of the alternate embodiment of the invention.

Removing the ad for a moment, FIG. 13 shows a side view of the gage 20 by itself. The gage has its generally cylindrical handle 30 upon the disc like base 31 with the centered and perpendicular tip 22 below it and extending opposite the handle. The handle has a diameter generally greater than that of the tip. The handle diameter provides for comfortable grasping by a user. The handle merges to the base at the juncture 32 that extends around the circumference of where the handle adjoins the disc. The tip is preferably round in its cross section to fit into a drain hole however, the Applicant foresees other cross section shapes to correspond with specific drain hole shapes. The tip its cylindrical shape in the alternate embodiment and extends away from the bottom surface 24 at a constant diameter, that is, width. Outwardly from the bottom surface, the tip has its nose 26 upon an end so that the nose inserts first into a drain hole during usage of the alternate embodiment. The nose is generally square to the remainder of the tip, that is, flat. Akin to the tip in FIG. 5, the tip in FIG. 13 has a diameter of about 2.5 mm to about 6 mm and a length of about 12 mm to about 25 mm, and the base of FIG. 13 akin to the bottom surface of FIG. 5 has a diameter of about 20 mm to about 45 mm.

As above, the top surface 23 is opposite the bottom surface and the circumferential wall 25 joins to both surfaces. Preferably, the handle is round with round top and bottom surfaces. Here, the top surface has that same diameter as the bottom surface so the wall 25 is generally parallel to the length of the handle. The removal device allows a user to grip the handle 30 and then remove the entire gage 20 from a drain without having to grip the circumferential wall 25 or the circumference of the bottom surface.

Figure 14:
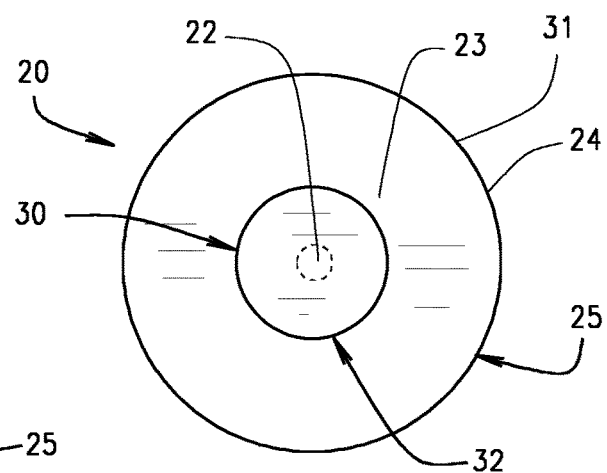
FIG. 14 shows a top view of the component of the alternate embodiment.

Looking at the top 33, FIG. 14 shows a top view of the alternate embodiment of the gage 20 with the handle 30 in the foreground and the tip 22 in the background and shown in phantom. In this view, the gage has its top 33 generally round as the upper end of the handle 30. Opposite the top, the handle merges with the base 31 at the juncture 32. Outwardly from the juncture, the base has its top surface 23 preferably round and of the same diameter as the bottom surface 24. From the top surface to the bottom surface, the wall 25 extends outwardly, joining the two surfaces. The wall has its height similar to the spacing between the top and bottom surfaces as previously shown. The gage has its tip 22 generally centered upon the bottom surface of the base.

Figure 15:
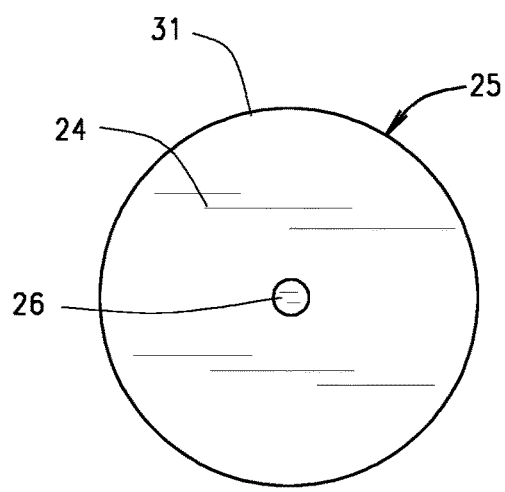
FIG. 15 illustrates a bottom view of the component of the alternate embodiment.

In the foreground of FIG. 15, the tip 22 appears nose 26 first. FIG. 15 provides a bottom view of the base 31 but with the tip in the foreground and the bottom surface 24 of the base 31 in the background. The tip has its flat nose and then a constant width, that is, diameter, markedly less than the diameter of the bottom surface 24. The tip extends from its nose to the bottom surface of the base. The tip merges with the base by mechanical means, press fit, adhesive, cohesive, thermal welding, and the like. The bottom surface is generally round and has a diameter slightly less than the inner diameter of an advertisement.

Figure 16:
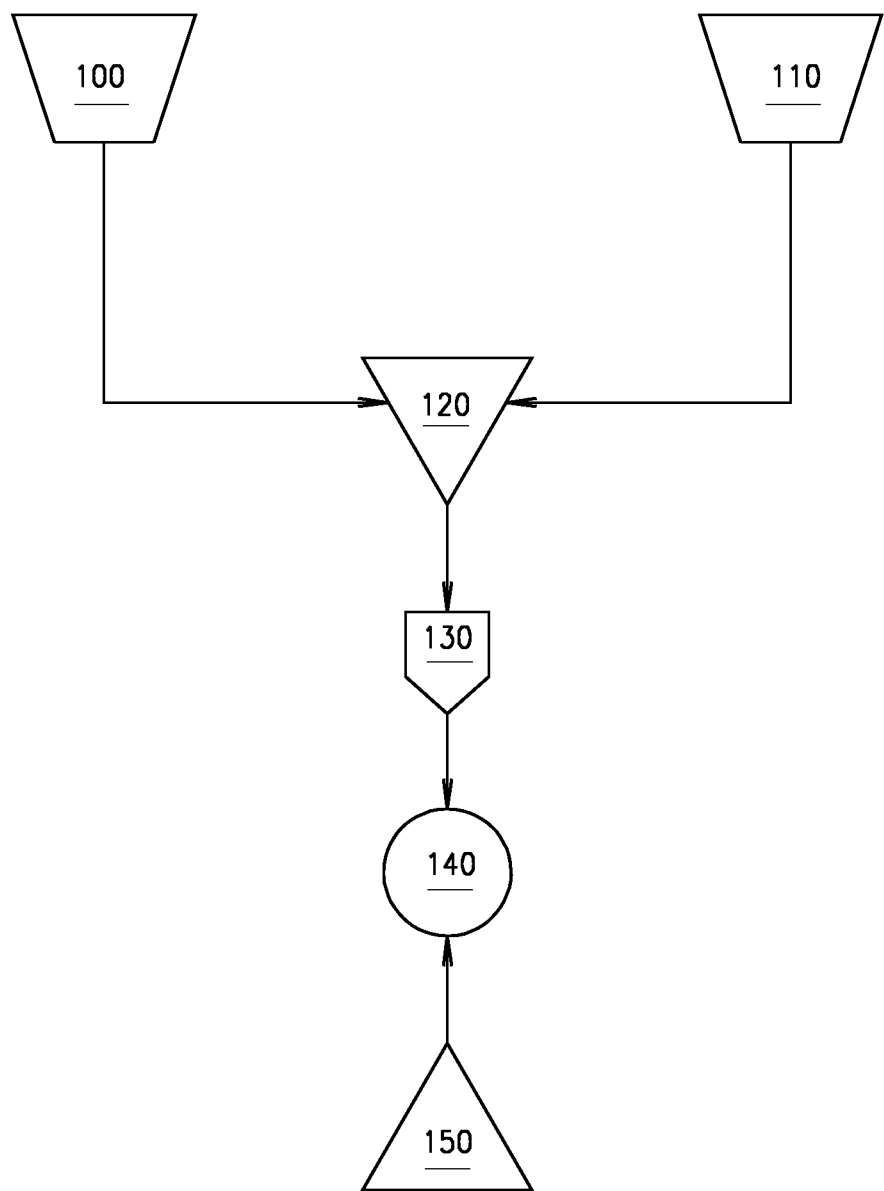
FIG. 16 shows a flow chart of a method of this invention.

Then FIG. 16 shows a method of the alternate embodiment that utilizes the previously described gage. An owner, lessee, or operator of a facility seeks to use the sink drains as an advertising platform. The facility owner, lessee, or operator then commissions installation of advertising, such as the rings 10 previously described and with suitable printing thereon. A user places a ring 10 upon the wall 25 of a gage 20, as in step 100. Alternatively, the user places the tip 22 with its nose 26 into a hole in a planar ad of similar shape and hole pattern as a drain D, as in step 110. With an ad 10 upon the gage 20, the user removes any release layer from the ad and then inserts the tip 22 into a hole of a drain as in step 120. As in step 130, the user then positions the ad 10 at an appropriate location. A user may orient the printing or other indicia upon the ad for readability, such as the printing being readable when a user faces a faucet. A user may also orient the indicia or printing upon the ad using markings preprinted upon the ad 10. Such markings generally guide the user to position the ad towards a faucet. With the ad 10 in position, the user presses upon the ad 10 or otherwise causes the ad to engage the drain's surface, as in step 140. Following securement of the ad 10 upon the drain D, the user removes to gage 20 from the drain, as in step 150. The user then proceeds to the next drain in the facility.

A sink can take many forms but an oval or a round shape appears often as shown in FIG. 17. The sink B has its rim R that generally rests upon a top not shown. A faucet F extends into the sink as commonly seen. Inwardly from the rim, the sink drops downwardly below the plane of the top. The sink drops left to right and front to back forming a depression, or bowl like shape so that any fluids, powders, dusts, and solids placed into the sink move under gravity towards the bottom of the sink. The bottom of the sink has the lowest distance beneath the rim R and the adjacent top as is commonly seen.

At the bottom, the sink has a drain ring D and within that a stopper S. The drain ring appears as the uppermost portion of tubular hardware secured to the sink bowl itself. The tubular hardware forms a water tight passage through the sink to the wastewater system. The ring also receives the stopper S in a watertight seal when the stopper is lowered so that the sink may hold water as desired by the user. Though FIGS. 1, 17 show a classic sink, the Applicant foresees application of the alternate embodiment upon bathtub stoppers that elevate from the bottom of a bathtub. The description that follows in referring to the alternate embodiment upon a sink stopper also applies to the alternate embodiment placed upon a tub stopper.

Turning to FIG. 18, a sink stopper S has the classic form shown extending above the drain ring D when the sink does not hold water. The sink stopper has its elongated body that has four orthogonal vanes 2 upon a common axial centerline. The vanes have a length generally greater than the width of the body. Each vane has two ends and upon one end tapers then curves inwardly to a lesser width, forming a neck usually positioned below the drain ring, and not shown. The vanes allow for passage of fluids past them and for passage of air through the overflow tube that opens in the sink drain proximate the neck when installed. As shown, the vanes 2 merge perpendicularly into a plate 6 that has a generally round shape with a diameter approximately twice that of the width of a vane. The width of two vanes is generally not much less than the inside diameter of the drain in a sink. The width of two vanes prevents the sink stopper from wobbling side to side along two axes when installed. Above the plate, the stopper has an annular seal 7 that has an inner diameter slightly smaller than the outer diameter of the plate. This inner diameter allows for a snug fit of the seal to the plate. The outer diameter of the seal exceeds that of the plate and is slightly more than the diameter of the drain. The seal is a flexible material that compresses under the weight of the stopper. Above the seal, the stopper has its cap 8 that secures to the plate often pivotally so that the cap may rotate about an axis upon the centerline of the stopper. The cap has a diameter greater than the plate and the seal but generally no more than the diameter of the drain opening, within the drain ring, at the bottom of a sink. The cap generally fits snugly in the drain opening. The cap has a lower surface 70 generally flat and towards the stopper body and an opposite upper surface 11 generally slightly spherical. The curvature of the upper surface aids in shedding water that falls thereon. The cap has its rim 12 that connects the lower surface to the upper surface. The rim has a round shape making the cap have a generally round form that matches the round drain openings common in sinks.

Looking more closely, FIG. 19 provides a perspective view of the alternate embodiment installed upon a cap 8. The alternate embodiment 1 is generally a planar sheet, often of disc shape that has a perimeter edge as at 71. In the alternate embodiment, the disc has a radius approximately that of the radius of the cap 8, generally with the disc's rim 71 at the edge of the cap and where the radius of the cap is half of its diameter. The cap rests upon four vanes 2 as previously described. The disc has a maximum size generally that of a drain ring of a sink, not shown. Returning to the disc itself, the disc has an upper surface 72 visible to the user and a lower surface 73 opposite the upper surface. The upper surface also displays an image, generally by printing, where the image may have various alphanumeric characters, logos, drawings, pictures, photographs, mascots, QR codes, bar codes, letters, words, text, sayings, slogans, computerized images, customized colors, names, company brands, patterns, graphics, logos, advertisements, indicia, art work, lettering, or a combination thereof. The alternate embodiment provides a wide selection of images from which users may choose. Users rarely see the lower surface following installation of the disc 1 upon a stopper S. Both the upper surface and the lower surface resist the action of fluids that commonly pass through sinks including water, isopropyl alcohol, chlorine, soap, shampoo, conditioner, acetone, various colognes and perfumes, and the like.

The upper surface displays the various decorations without bleeding and fading for at least two years. Though this and other figures show the disc 1 upon a stopper, the Applicant foresees the alternate embodiment also fitting upon flat sink drains that do not have an elevating stopper. In this alternate embodiment of the alternate embodiment, the disc 1 has a hole pattern there through that matches with the hole pattern in the flat drain. The disc hole pattern may be manufactured or scored for a user to open before or during installation.

The alternate embodiment 1 has a planar sheet of a shape similar to the drain, primarily round, though the Applicant foresees other shapes. The sheet has at least two layers, including a receiving layer and an adhesive layer beneath the receiving layer. The adhesive layer bonds to the receiving layer while the receiving layer has an ink layer with coloration or printing to suit the aesthetic tastes of the homeowner. The adhesive layer though grips the cap of a stopper securing the cover device in its desired location. The receiving layer may be vinyl, polymer, or metal foil. In the absence of an additional layer, the receiving layer remains suitable for an environment that includes water, isopropyl alcohol, acetone, and chlorine. In an alternate embodiment, the device includes a clear laminate applied upon the receiving layer opposite the adhesive layer. The clear laminate has a transparent construction, that is, of high gloss, and protects the receiving layer with its inherent resistance to water, isopropyl alcohol, acetone, and chlorine expected to enter sinks during usage. The clear laminate has a generally clear gloss finish that also allows for display of the ink layer upon the receiving layer and its visibility to homeowners. The device has its width, primarily a radius, that has a minimum size of the width of the stopper cap. Alternatively, the device has a greater width than the cap so that the sheet may extend over a drain ring concentric but outwardly of the cap. The device excludes the adhesive layer from the portion outwardly of the cap. The receiving layer, and alternatively the clear laminate, has sufficient rigidity to prevent warping or drooping of the alternate embodiment upon elevating the stopper from the drain ring.

The alternate embodiment has alternate diameters of 1.00 inch, 1.25 inch, 1.5 inch, 1.75 inch, 2 inch, or up to 3 inch, an additional 1 inch to 2 inch width to cover the drain ring, fiberglass strands embedding in the receiving layer for rigidity, and a thickness of the device less than that of the cap. A further alternate embodiment of the alternate embodiment includes an annular ring that fits upon the drain ring only of a sink, preferably a flat commercial drain. This alternate embodiment has its annular ring with a shape or slit that accommodates the concave or truncated concave shape of a drain ring in select sinks. With this accommodation, the annular ring of the alternate embodiment avoids puckering and adhering to itself because of the drain ring shape and slope. Though the preferred and alternate embodiments above refer to the size of the cap, the alternate embodiment may have an inexact fit to certain stoppers or drains. The Applicant prefers that the alternate embodiment has a slightly less diameter or width in an inexact fit so the remaining visible cap or drain provide a frame or border to the inexactly fit disc. A further alternate embodiment of the alternate embodiment has the cover device with a diameter that exceeds the stopper so that the present alternate embodiment covers both the stopper and the adjacent ring.

FIG. 19*a* shows an alternate embodiment of the alternate embodiment 1 where the disc like shape has a diameter slightly less than that of the cap 8. This slight inset in disc diameter provides an aesthetic border to the alternate embodiment and allows an edge for homeowner to grasp during a future removal of the alternate embodiment from the cap.

The disc itself of the alternate embodiment appears in a section view in FIG. 20. The disc 1 has its upper surface 72 and the lower surface 73. The disc has its radius here shown as R above the upper surface. More particularly, the disc has a receiving layer 74 or substrate, generally opaque. The receiving layer may be made of vinyl, and the like. Upon the receiving layer, the alternate embodiment has a decorative layer, or its ink layer 75 that includes a desired image applied as printing through various commonly known printing processes. Upwardly from the ink layer 75*a*, the disc 1 has a clear laminate layer 76. The clear laminate layer provides the resistance to fluids for the ink layer. The clear laminate layer is generally of a high gloss that promotes durability and a smooth lamination to the other adjacent layers. The high gloss of the laminate layer equals or exceeds 70 gloss units. The clear laminate layer and the receiving layer capture the ink layer between them. If the receiving layer has a construction from vinyl, the vinyl has high elasticity and requires the clear laminate layer for minimal rigidity so that the device retains its selected size and shape, during manufacturing, printing, and installation. When viewed from above, the clear laminate layer 76 becomes the upper surface 72. Then downwardly from the receiving layer 74, the disc includes an adhesive layer 78. The adhesive layer bonds permanently to the receiving layer above it and bonds releasably from a cap 8 when installed upon a stopper S. Upon removing the alternate embodiment from a stopper cap, the adhesive layer leaves no residue. The adhesive layer includes solvent acrylics, pressure sensitive adhesives, such as those in Controltac® Graphic Film with Comply® of 3M of St. Paul, Minn., and other vinyl based products, and the like. The clear laminate layer, the ink layer, the receiving layer and the adhesive layer cooperate as a cold lamination and the adhesive layer bonds, or cures, to the other layers utilizing pressure alone, that is, without heat for its curing. In an alternate embodiment other adhesives may be used that required heat curing. Outwardly from the adhesive layer, the disc includes a release liner 78, preferably of polyethylene coated paper. The release liner protects the adhesive layer from premature bonding to an undesired surface or location. The clear laminate 76, ink layer 75, receiving layer 74, and adhesive layer 72 have the rim 71 in common. Preferably, the clear laminate extends around the rim for the circumference of the disc. The clear laminate layer, the receiving layer, the adhesive layer when mutually laminated undergo a contour cut, or a kiss cut, leaving them slightly inset from the edges of the release layer 78, as shown, for ready removal of the alternate embodiment for its installation. The contour cut, or kiss cut, avoids piercing the release layer. The release layer though has a full cut outwardly from the remaining layers separating one alternate embodiment from another during manufacturing. In an alternate embodiment, the release layer's full cut generally follows a shape, if present, in the ink layer. In a further alternate embodiment, the alternate embodiment has a generally rectangular shape with the kiss cut and full cut as above. The generally rectangular shape of the release layer leaves room, as in a strip like shape, outwardly of the adhesive and other layers. The strips of release layer provide room for printing or other decoration in this further alternate embodiment.

FIG. 21 shows installation of the disc 1 upon a stopper S particularly upon the cap 8. To reach FIG. 21, a user separates, or disengages, the release liner 78 shown in FIG. 4 from the remainder of the alternate embodiment, and then positions and orients the receiving layer as desired. The user then presses the adhesive layer upon the cap 8 paying attention to align the rim 71 of the disc 1 with the rim 12 of the cap. The user must center the disc so that the adhesive layer does not bond to the drain ring inadvertently. On select stoppers, the cap 8 may have its own radius of curvature, here shown as $R_c$ where the radius of curvature is generally aligned towards the length of the vanes 2. The receiving layer 74, ink layer 75, clear laminate 76, and the adhesive layer 77 account for a slight curvature to the cap's surface so that the clear laminate and the ink layer do not crack or stretch unnecessarily. The adhesive layer 77 allows for release of any air beneath it so that the receiving layer 74, ink layer 75, and clear laminate 76 avoid any bubbling, buckling, blistering, or other distortions to the image displayed by the ink layer to the homeowner. Also, the Applicant notes that heat applied to the alternate embodiment 1 allows a user to mold, stretch, or in some cases shrink it to fit a particular stopper. Particularly the receiving layer and the clear laminate stretch slightly without breaking the surface of the ink layer which prevents introduction of fluids into the ink layer.

Though this description has referred to adhesive, as at 77, the Applicant foresees usage of magnets, magnetic material as the receiving layer, cohesives, pressure sensitive adhesives, and other binding agents.

Though this description has also referred to an ink layer, as at 75, the Applicant foresees other methods of applying an image, or other decorative element, to the receiving layer. Such methods include toner, laser printing, paint, non-aqueous solutions, aqueous solutions, dye, chromic related chemical reactions, and the like.

The gage aligns a planar material placed outwardly upon it. The tip fits into any hole of a multiple hole drain in a sink, such as at a public restroom. Preferably, a user aligns the tip for placement into the center of a pattern of holes for a centered installation of the device, if desired. The tip then aligns the gage to be centered upon the drain which leads to a centered application of the planar material upon the sink bowl near a drain. The gage has two surfaces, a top and an opposite bottom that has the tip joined thereto. Between the two surfaces and upon its perimeter, the gage has a wall with a slight inward flare, or bevel, with its wide portion towards the bottom. The flare centers the planar material as a user places it upon the gage and moves it downwardly towards the drain. The user then removes the gage through the planar material, leaving it behind, centered upon the drain. The planar material is preferably a ring having indicia upon it.

Figure 22:
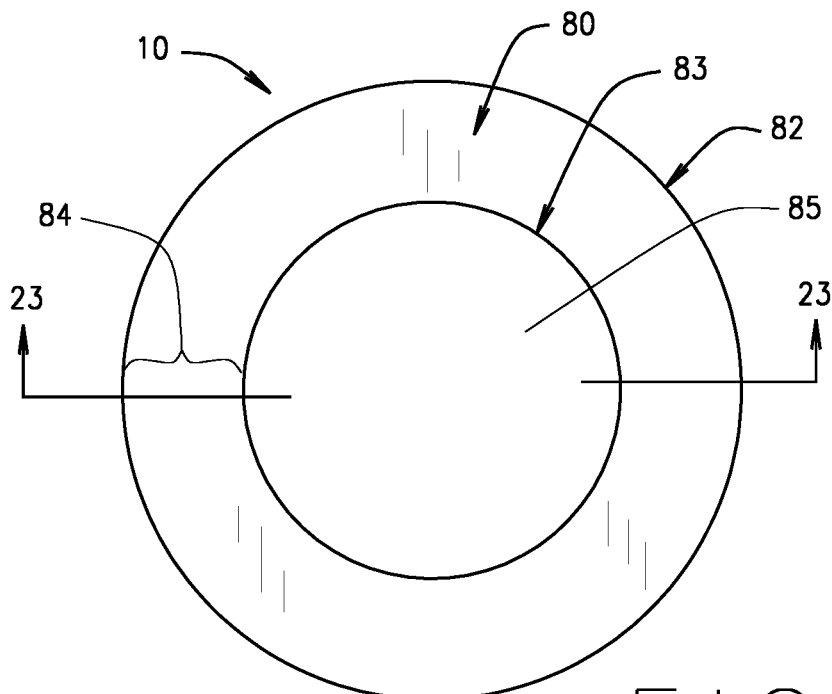
FIG. 22 provides a top view of the alternate embodiment of the invention.

FIG. 22 shows the invention 10 in its preferred embodiment from the top. Alternate embodiments of the invention appeared previously above in FIGS. 2, 3, 4, 8, 10, 11, 12. The preferred embodiment of the invention 10 has a flat, wide, ring like shape. The invention has a top surface 80 generally round of a constant radius and an opposite bottom surface 81, not shown in this figure. The top surface has an outer edge 82 generally upon its perimeter and visible to users of the invention. The outer edge spans from the top surface to the bottom surface as later shown in FIGS. 2, 3. The outer edge denotes the maximum radius of the invention. Inwardly from the outer edge, the invention 10 has a band 84 with a width. The band has a width from about 10/32 inch to about ½ inch. Inwardly from the band and spaced inward from the outer edge, the invention has its inner edge 83 of a constant radius less than that of the outer edge. The difference between the radii of the outer edge and the inner edge defines the width of the band 84. Inside of the inner edge, the invention has an aperture 85. The aperture has its position upon the common center of the inner edge, the outer edge, and the invention itself. The aperture generally allows passage of a stopper upon installation of the invention on a drain as later shown.

Figure 23:
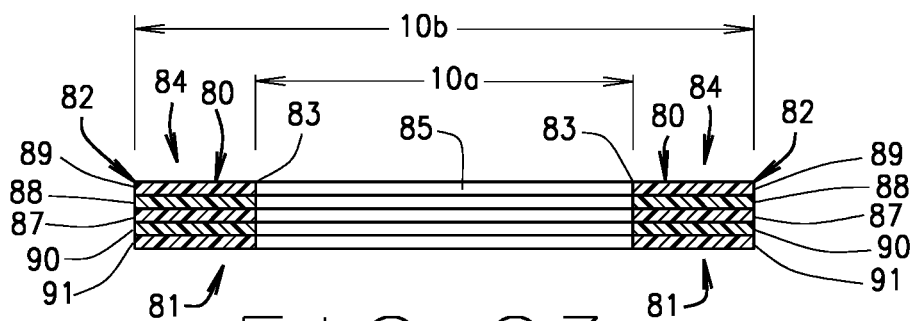
FIG. 23 shows a side sectional view of the invention.

Turning the invention to the side, FIG. 23 shows an enlarged section view of the ring as at 10. The invention has it generally round shape with centered aperture as shown and described previously. The invention 10 has an inner diameter 10a from inner edge 83 to inner edge 83 across the aperture where the inner diameter is twice the radius of the inner edge, and an outer diameter 10b from outer edge 82 to outer edge 82 across the aperture where the outer diameter is twice the radius of the inner edge. The outer diameter exceeds the inner diameter. The inner diameter is at least that of the outermost diameter of any hole pattern in a drain as later shown in FIG. 26. The invention does not impede the draining of fluids and slurries through the drain. The outer diameter is at least that of the diameter of a drain itself, usually seen as a metal plate having the hole pattern.

The invention has a construction generally of flexible layers. The layers define the band 84 and extend around the perimeter of the invention and define the aperture. This sectional view cuts the layers in two locations and the description applies to both locations as shown in this figure. The invention 10 has its top surface 80 and its opposite lower surface 81. The disc has its inner diameter 10a and outer diameter 10b here above the upper surface. More particularly, the invention has its receiving layer 87 or substrate, generally opaque an of annular shape. The receiving layer may be made of vinyl, paper, and the like. Upon the receiving layer, the invention has a decorative layer, or its ink layer 88 that includes a desired image applied as printing through various existing printing processes. Upwardly from the ink layer 88, the invention 10 has an inherent clear laminate layer 89. The clear laminate layer provides the resistance to fluids for the ink layer. The clear laminate layer is generally of a high gloss that promotes durability and a smooth lamination to the other adjacent layers. The high gloss of the laminate layer equals or exceeds 70 gloss units. The clear laminate layer and the receiving layer capture the ink layer between them. If the receiving layer has a construction from vinyl, the vinyl has high elasticity and requires the clear laminate layer for minimal rigidity so that the device retains its selected size and shape, during manufacturing, printing, and installation. When viewed from above, the clear laminate layer 89 becomes the upper surface 80. Then downwardly from the receiving layer 87, the invention includes an adhesive layer 90. The adhesive layer bonds permanently to the receiving layer above it and bonds releasably to a sink's surface when installed about a drain as later shown. Upon removing the invention from a sink, the adhesive layer leaves no residue. The adhesive layer includes solvent acrylics, pressure sensitive adhesives, such as those in Controltac® Graphic Film with Comply® of 3M of St. Paul, Minn., and other vinyl based products, and the like. The clear laminate layer, the ink layer, the receiving layer and the adhesive layer cooperate as a cold lamination and the adhesive layer bonds, or cures, to the other layers utilizing pressure alone, that is, without heat for its curing. In an alternate embodiment other adhesives may be used that required heat curing. Outwardly from the adhesive layer, the invention includes a release liner 91, preferably of polyethylene coated paper and denotes the lower surface or bottom 81 of the invention. The release liner protects the adhesive layer from premature bonding to an undesired surface or location. The clear laminate 89, ink layer 88, receiving layer 87, and adhesive layer 90 have the outer edge 82 and the inner edge 81 in common. These four layers have a generally annular shape upon a common center with the inner radius and the outer radius. Preferably, the clear laminate extends around the rim for the circumference of the invention. The clear laminate layer, the receiving layer, the adhesive layer when mutually laminated undergo a contour cut, or a kiss cut, leaving them with a common inner edge 83 generally perpendicular to the top surface 80 and to the bottom surface 81 and with a common outer edge 82 generally perpendicular to the top surface 80 and to the bottom surface 81. These four layers and the release layer beneath them form the band here shown in two portions. In the preferred embodiment, the layers described above each have a generally ring like form and mutually stack upon a common center. In a further alternate embodiment, the invention has its ring like shape punched from the layers assembled in sheet like form.

The layers, particularly the clear laminate layer 88 and the adhesive layer 90 provide water resistance to the invention so that it remains together upon exposure to the liquids and slurries common in residential sinks. The clear laminate layer also provides a smooth surface for fluid drainage and resistance to engagement with objects fallen into a sink.

As shown in this figure, the band 84, really the invention 10, has its thickness 92 defined by the stack layers as shown. The thickness is generally less than 1/80 of inch, approximately less than 1/3 of a millimeter. As described above, the band has a width from about 10/32 inch to about 1/2 inch. The ratio of band to thickness is from about 25 to about 40. The band to thickness ratio allows the invention to remain integral and avoid separation under its own weight, typically from being to thin in thickness 92. The band to thickness ratio also allows the invention to bend so that the invention may undergo printing with rollers and without disintegrating.

This figure also shows that the layers stack so that the inner edge and the outer edge both attain a perpendicular orientation to the top surface 80 and the bottom surface 81. Thus, the inner edge and the outer edge are generally square and the top surface is mutually parallel and spaced apart from the bottom surface.

Figure 24:
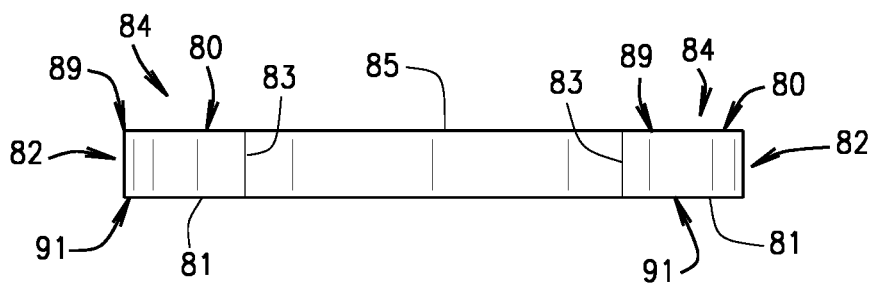
FIG. 24 illustrates a side view of the invention.

FIG. 24 then shows the invention in a side view, or upon edge. This view has the outer edge 82 in the foreground. The outer edge extends outwardly to the bands 84 and has the aperture 85 generally centered upon the invention. Each band shown, left and right in this view, has a clear laminate layer 89 denoting the top surface 80 and an opposite release layer 91 denoting the bottom surface 81. Each band then ends outwardly at the outer edge 82. Within the bands, the aperture 85 begins at the inner edges 83 and extends inwardly, here shown in phantom. The top surface 80 remains mutually parallel and spaced apart from the bottom surface 81 along the entire extent of the band 84.

Figure 25:
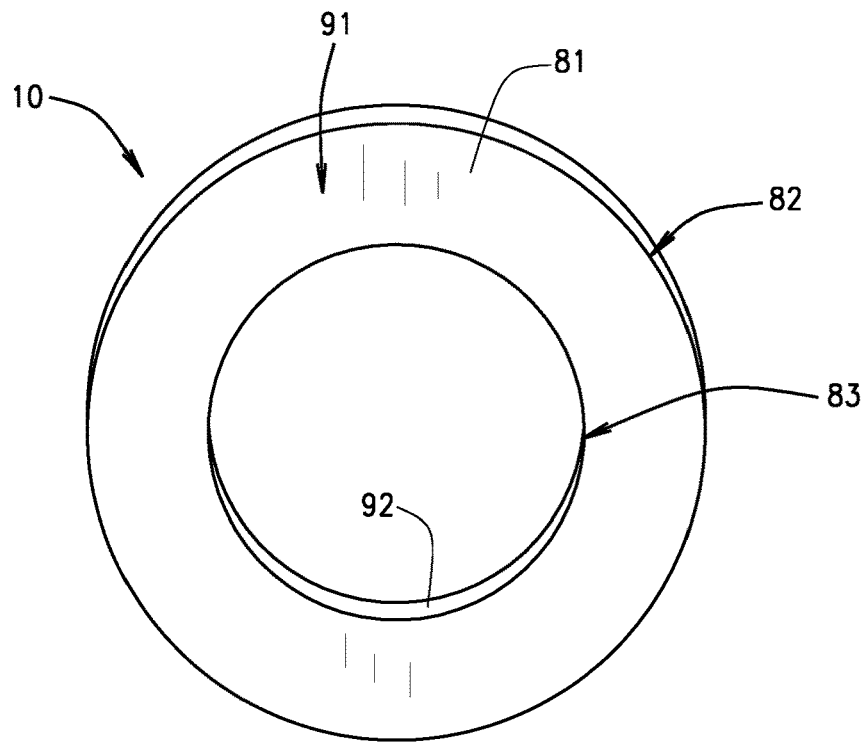
FIG. 25 shows a top view of the invention.

Then, FIG. 25 has a bottom view of the invention 10 with the lower surface 81 in the foreground. The lower surface appears as the release layer 91 with a band 84 extending around the perimeter of the invention and an aperture 85 generally centered therein. The band has the outer edge 82 of greater radius than the inner edge 83 as described above. Between the bottom surface 81 and the top surface, not shown, the invention has its thickness 92. The bottom surface need not have transparency but must have water resistant adhesion to a sink.

Figure 26:
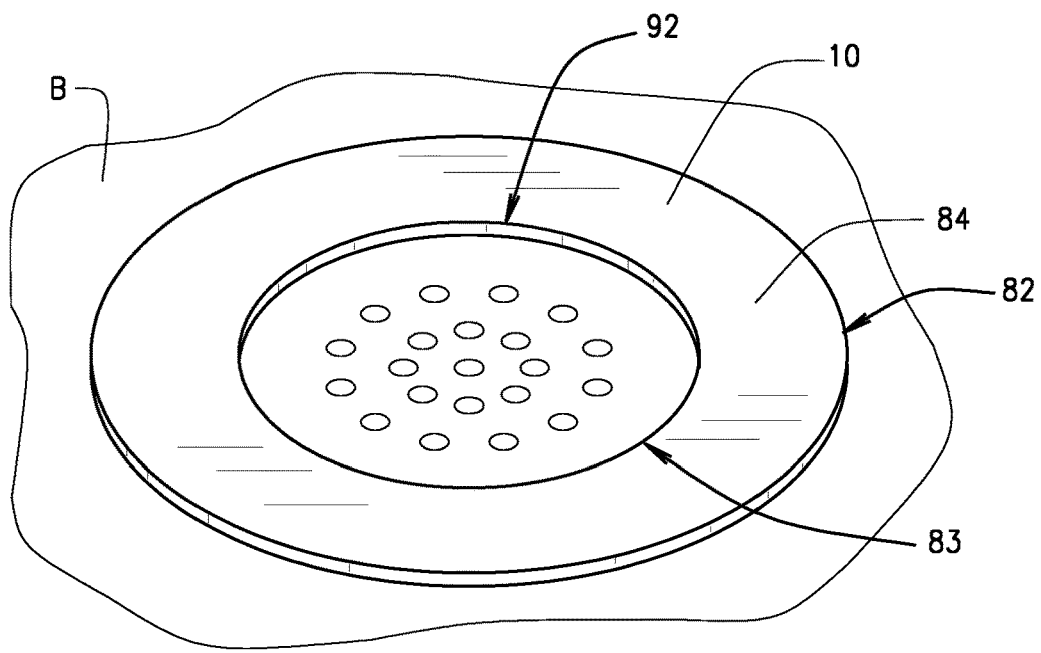
FIG. 26 describes a perspective view of the invention installed.

Next, FIG. 26 shows the invention 10 installed around a drain. The invention has its top surface 80 upwardly, that is, towards the middle of the page and the bottom surface, not shown, as it abuts the drain D. The inner edge 83 has its position near the drain while the outer edge 82 is outwardly from the drain. The band 84 encircles the drain and provides sufficient width for printing or other indicia applied to it that a user may read.

Figure 27:
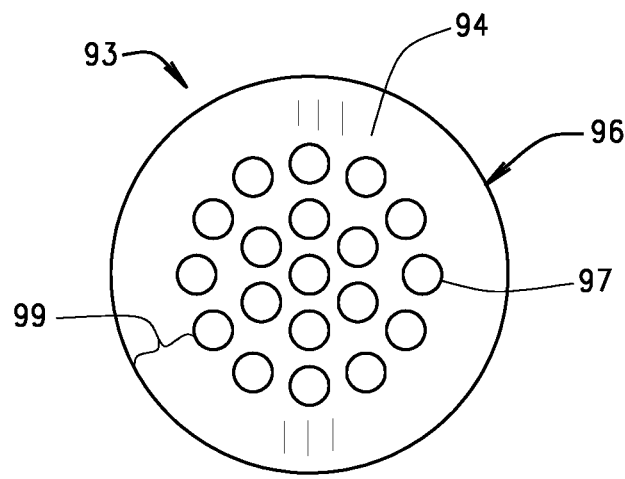
FIG. 27 provides a top view of an alternate embodiment of the invention.

FIG. 27 shows a further alternate embodiment of the invention as at 93. This embodiment begins as a disc that then has a pattern of holes, 97, or grid, placed into it. This pattern as shown aligns with a nineteen hole pattern typically seen in commercial restroom sink drains. This embodiment has a generally round shape with a top surface 94 and an outer edge 96 at the perimeter of the top surface as shown. The pattern of holes 97 has a somewhat round shape where the hole outermost from the center of the embodiment 93 remains inset from the outer edge 96. The gap between the outermost hole and the outer edge 96 defines a print band 99. The print band has a nearly constant width though it fluctuates slightly when near a hole and when away from a hole as shown.

Figure 28:
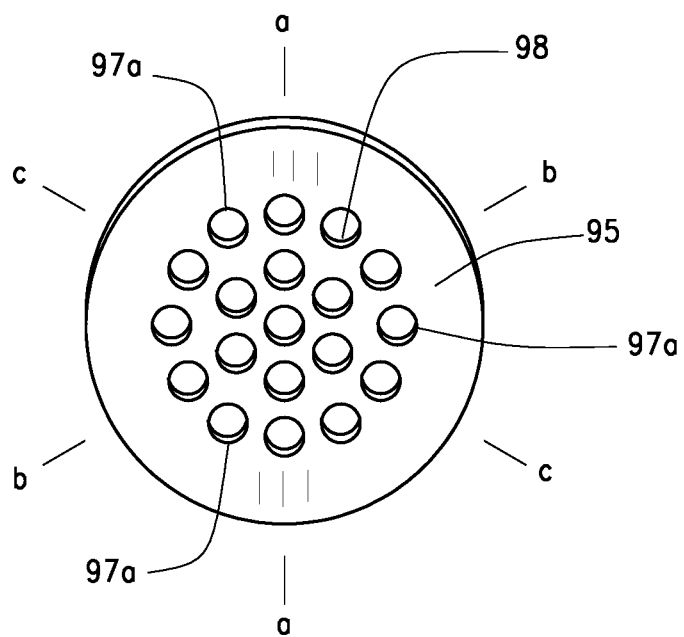
FIG. 28 shows a bottom view of this alternate embodiment.

Turning the further alternate embodiment over, FIG. 28 shows the a bottom view with a bottom surface 95 in the foreground. The pattern of holes continues to the bottom surface so that a hole 97 allows for drainage of fluids through this embodiment. A hole shows the thickness of the embodiment, as at 98. This embodiment has a layered construction as previously described above. The pattern of holes includes holes arrayed upon three radial lines, as at a-a, b-b, c-c, generally equiangular and a few holes, as at 97a, not upon a radial line that fill gaps between the holes on the radial lines.

From time to time, users of the invention may identify it with stickers. However, the present invention does not fit within the class of stickers. The present invention operates as a decorative lamination of multiple layers. The present invention resists the hazards, liquids, and users of all ages of a typical residential sink. After many years of service, a user may seek to replace the device with a new one. The present invention, particularly the adhesive layer, removes readily from a drain with no residue left behind. To remove the invention, a user places a thumb and forefinger upon an outer edge 82, 96 then the forefinger grips and pulls up the edge of the invention 10, 93 and then the entire device peels off the drain, all in one piece with no residue, no scrapes, and no impact.

Figure 29:
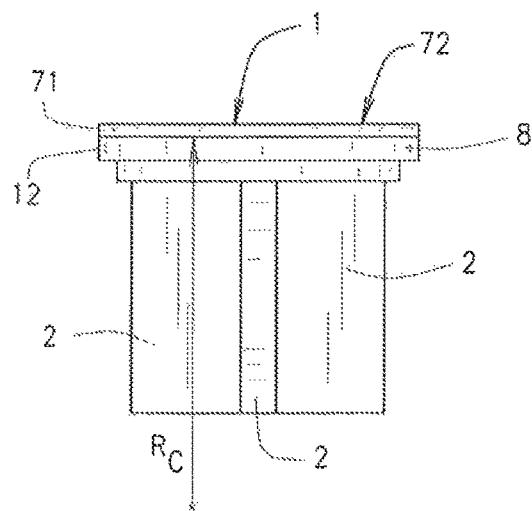
FIG. 29 illustrates a side view of the invention installed upon a stopper having a top.

FIG. 29 shows installation of the preferred embodiment of the disc 1 upon a stopper S particularly upon the cap 8, in a side view. Alternate embodiments of the invention appeared previously above in FIGS. 2-8, 9A-C, 10-15, 16, 17-20, 22-26, and 27-28. To reach FIG. 29, a user separates, or disengages, the release liner 78 previously shown in FIGS. 4, 20 from the remainder of the preferred embodiment, and then places and orients the receiving layer as desired. The user then presses the adhesive layer upon the cap 8 paying attention to align the rim 71 of the disc 1 near the rim 12 of the cap. The user centers the disc so that the adhesive layer does not bond any adjacent drain ring inadvertently. The disc 1 has its upper, or top surface 72 shown outwardly towards a user, that is, away from the vanes. On select stoppers, the cap 8 may have its own radius of curvature, here shown as $R_c$ where the radius of curvature is generally aligned towards the length of the vanes 2, as later described in FIG. 33. The cap may have a diameter from 0.75 inch to at least three inches. The receiving layer 74, ink layer 75, clear laminate 76, and the adhesive layer 77 accommodate a slight curvature to the cap's surface so that the clear laminate and the ink layer do not crack. The receiving layer 74, ink layer 75, clear laminate 76, and the adhesive layer 77 combine into a thin cross section so that the invention fits upon stopper caps 8 that have a large radius of curvature. The adhesive layer 77 allows for release of any air beneath it so that the receiving layer 74, ink layer 75, and clear laminate 76 above it avoid any bubbling, buckling, blistering, or other distortions to the image displayed by the ink layer to the homeowner. Also, the Applicant notes that heat applied to the alternate embodiment 1 allows a user to mold, stretch, or in some cases shrink it to fit a particular stopper. Particularly the receiving layer and the clear laminate stretch slightly without breaking the surface of the ink layer which prevents introduction of fluids into the ink layer, that is, the disc of the invention is water resistant. Further, the construction of the layers of the invention makes it capable of immersion in water for a lengthy time.

Though this description has referred to adhesive, as at 77, the Applicant foresees usage of magnetic material as the receiving layer, cohesives, pressure sensitive adhesives, and other binding agents.

Though this description has also referred to an ink layer, as at 75, the Applicant foresees other methods of applying an image or other decorative element to the receiving layer. Such methods include toner, laser printing, paint, non-aqueous solutions, aqueous solutions, dye, chromic related chemical reactions, and the like.

Figure 30:
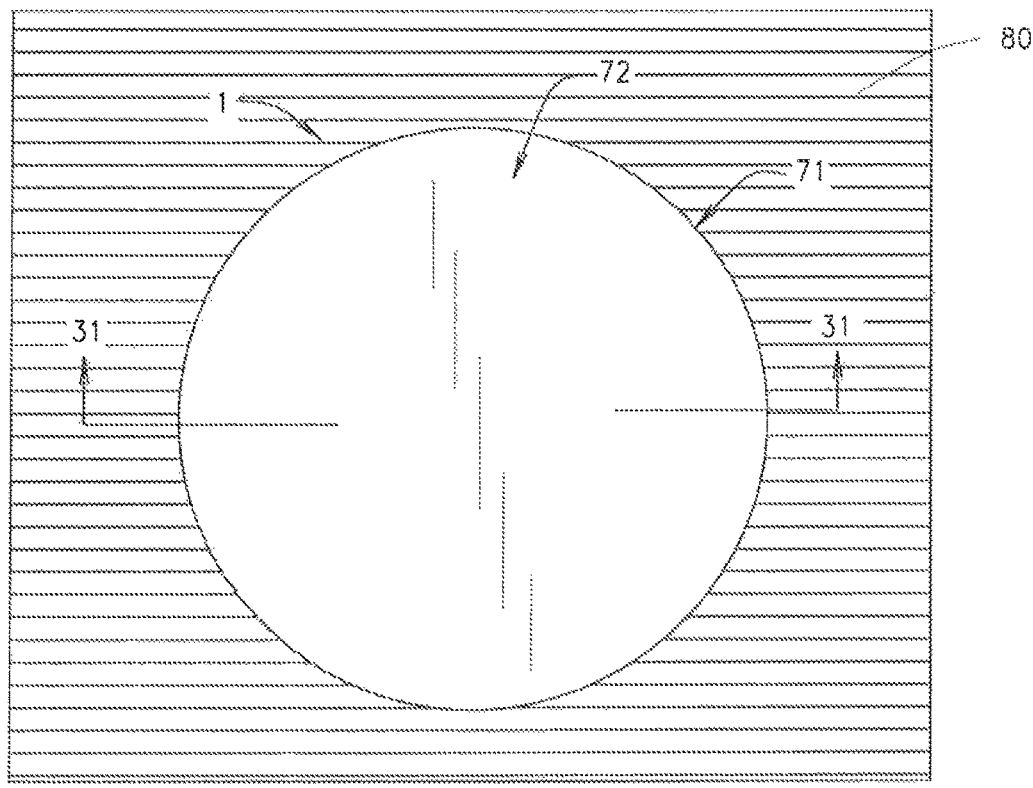
FIG. 30 shows a top view of the preferred embodiment of the invention.

FIG. 30 shows a top view of the preferred embodiment of the invention 1. The preferred embodiment of the invention 1 has a flat, wide, round, disc like shape with a diameter. The invention has a top surface 72 generally round of a constant radius and an opposite bottom surface 73, not shown in this figure. The top surface and the bottom surface have a spacing apart, the thickness as at 71a, and are mutually parallel. The top surface has an outer edge, or rim 71, generally upon its perimeter and visible to users of the invention. The outer edge is generally perpendicular to the top surface and the bottom surface and round. Outwardly from the rim, the invention has its release layer 78. The release layer has a plurality of shallow grooves therein as at 80. The grooves extend parallel to the plane of the top surface 72. The grooves themselves are mutually parallel as shown.

The disc 1 itself of the preferred embodiment appears in a section view in FIG. 31. The disc 1 has its upper or top surface 72 and the lower or bottom surface 73. The bottom surface joins to a supporting surface, here, the cap of a sink stopper. The disc has its radius here shown as 92b above the upper surface and thus its diameter shown as 92a. The disc has a thickness less than 1/80 inch and a diameter to thickness ratio of from about 75 to about 175. The disc has a construction from multiple layers that commonly include the rim or outer edge as at 71. More particularly, the disc has a receiving layer 74 or substrate, generally opaque. The receiving layer may be made of vinyl, and the like. Upon the receiving layer, the preferred embodiment has a decorative layer, or its ink layer 75 that includes a desired image applied through known printing processes. Upwardly from the ink layer 75, the disc 1 has a clear laminate layer 76 serving as the top surface 72. The clear laminate layer is a transparent layer and provides the resistance to fluids for the ink layer. The clear laminate layer is generally of a high gloss that promotes durability and a smooth lamination to the ink layer contiguously beneath and any other adjacent layers. The high gloss of the laminate layer equals or exceeds 70 gloss units. The clear laminate layer and the receiving layer capture the ink layer between them. The top surface displays an image, such as a picture, photograph, drawing, message, and the like, to a user from the ink layer through the clear laminate layer.

The laminate layer also promotes a three dimensional appearance of the invention to a user because of its inherent reflective high gloss. The laminate layer reflects ambient light from sources near a sink having the invention installed thereon. The laminate layer has a minimum of scattering caused to its reflected light. More particularly, the laminate layer has its coefficient of luminous intensity, $R_I$, that measures reflective performance. Coefficient of luminous intensity is the ratio of the strength of the reflected light (luminous intensity) to the amount of light that falls on the reflector (normal illuminance), here the laminate layer, expressed in millicandela per lux, or mcd/lx. A reflector appears brighter to a user as its $R_I$ value grows larger. The $R_I$ value of a reflector, here the laminate layer, blends the color, size, and condition of the reflector. Clear or white reflectors have greatest optical efficiency, and appear brighter than other colors. The surface area of the reflector also has a proportion to the $R_I$ value that grows as the reflective surface area grows. The clear laminate layer of the invention provides maximum reflectivity of light. The laminate layer also reflects the edge, or rim 71, of the stopper S.

When the receiving layer has a vinyl construction, the vinyl has high elasticity and has the clear laminate layer for minimal rigidity so that the device retains its selected size and shape, during manufacturing, printing, and installation. When viewed from above, the clear laminate layer 76 becomes the top surface 72 to a user. The clear laminate layer makes the top surface smooth and transparent. Then downwardly from the receiving layer 74, the disc includes an adhesive layer 77. The adhesive layer bonds permanently to the receiving layer above it and links to a release layer 78. Upon a user separating the disc 1 from the release layer 78, the adhesive layer 77 bonds releasably from a cap 8 when installed upon a stopper S, or other supporting surface, as previously shown in FIG. 29. Upon removing the preferred embodiment from a stopper cap, the adhesive layer does not leave any residue. The adhesive layer includes solvent acrylics, pressure sensitive adhesives, such as those in Controltac® Graphic Film with Comply® of 3M of St. Paul, Minn., and other vinyl based products, and the like. The clear laminate layer, the ink layer, the receiving layer and the adhesive layer cooperate as a cold lamination and the adhesive layer bonds, or cures, to the other layers utilizing pressure alone, that is, without heat for its curing. Alternatively, other adhesives may be used that required heat curing. Outwardly from the adhesive layer, that is, beneath it, the disc 1 has the release layer 78, preferably of polyethylene coated paper. The release layer protects the adhesive layer from premature bonding to an undesired surface or location, such as packaging. The release layer has a plurality of shallow grooves therein as at 80. The grooves extend parallel to the plane of the top surface 72. The grooves themselves are mutually parallel as shown.

Having described the layers of the preferred embodiment, the disc 1 of the invention has interfaces between adjacent layers. A first interface 74a joins the ink layer 75 to the receiving layer 74 and extends at least partially across the receiving layer. A second interface 75a joins the laminate layer 76 to the ink layer 75 and extends completely across the ink layer. The second interface seals the laminate layer to the ink layer and prevents intrusion of water and other substances into the invention. Beneath the receiving layer, a third interface 77a denotes a permanent bond of the adhesive layer 77 to the receiving layer. The third interface also extends completely underneath the receiving layer so that the adhesive layer has a full bond to the upper three layers of the invention. And a fourth interface 78a releasably connects the release layer 78 to the adhesive layer 77 opposite the third interface 77a. The fourth interface denotes a separation surface that appears upon removal of the release layer during installation upon a sink stopper by a user. The fourth interface then engages the cap 8 of a stopper as previously shown. More particularly, the first interface 74a represents the depositing, bonding, or joining of ink from the ink layer 75 to the receiving layer 74. The first interface identifies where the ink merges with the receiving layer. The second interface represents the laminate layer 76 as it covers ink or other printing material of the ink layer 75 and any interstitial spaces between portions of ink, e.g. hollow portions of letters, numerals, characters, and the like. Extending over the ink and interstitial spaces, the second interface identifies where the laminate layer merges with the ink layer and the receiving layer beneath it. Towards the bottom surface and below the receiving layer, the third interface 77a identifies the permanent bond of the adhesive layer 77 to the receiving layer. The third interface identifies where the adhesive layer knits into the receiving layer so that both layers remain together, before and during usage of the invention. Then beneath the adhesive layer, the fourth interface 78a shows the joint between the release layer 78 and the adjacent adhesive layer 77. The fourth interface shows the plane from which the release layer separates thus exposing the adhesive layer for securement upon a supporting surface.

The clear laminate 76, ink layer 75, receiving layer 74, and adhesive layer 72 have the rim 71 in common. Preferably, the clear laminate extends around the rim for the circumference of the disc. The clear laminate layer, the receiving layer, and the adhesive layer when mutually laminated undergo a contour cut, or a kiss cut, leaving them slightly inset from the edges of the release layer 78, as shown, for ready removal of the alternate embodiment for its installation. The contour cut, or kiss cut, avoids piercing the release layer. The release layer though has a full cut outwardly from the remaining layers separating one disc 1 from another during manufacturing. In a still alternate embodiment, the release layer's full cut generally follows a shape, if present, in the ink layer. In a further alternate embodiment, the alternate embodiment has a generally rectangular shape with the kiss cut and full cut as above. The generally rectangular shape of the release layer leaves room, as in a strip like shape, outwardly of the adhesive and other layers. The strips of release layer provide room for printing or other decoration in this further alternate embodiment.

FIG. 32 then shows the invention in a side view, with its rim 71 visible on edge. This view has the rim 71 in the foreground. In the preferred embodiment, the clear laminate layer 76 extends downwardly upon the rim towards the release layer 78 and the bottom surface 73. The disc has the clear laminate layer 76 denoting the top surface 72 and an opposite release layer 78 denoting the bottom surface 73. The top surface and the bottom surface are mutually parallel and spaced apart along the entire extent of the disc 1.

FIG. 33 provides a side view of a further alternate embodiment of the invention. The disc 1 has its parallel upper surface 72 and the lower surface 73 as before. The disc has its radius 92b and thus its diameter as at 92a. The disc has the opaque receiving layer 74 that may be made of vinyl, and the like. Upon the receiving layer, this further alternate embodiment has the ink layer 75' similar to that described above. This ink layer though has its perimeter rounded downwardly similar to an ogee form. Upon the ink layer 75', the disc 1 then has its clear laminate layer 76' also of a high gloss as described above. This laminate layer 76' though has its perimeter rounded downwardly similar to an ogee form. The laminate layer curls downwardly around the disc and then overlaps the rim of the ink layer. The laminate layer seals the exposed edge of the ink layer around the disc. A user sees the upper surface 72 or, the uppermost of the clear laminate layer 76'. Then downwardly from the receiving layer 74, the disc has its adhesive layer 77b. This adhesive layer has a generally concave shape as shown. The layer has a thick portion outwardly towards the rim that then thins to a narrow portion at the center of the disc, as shown at 77c. The concave shape of the adhesive layer accommodates a cap having a radius of curvature $R_c$ from about six feet to about one thousand feet. As before, the adhesive layer bonds permanently to the receiving layer above and links to the release layer 78' below. The release layer has a cooperating convex shape that fits with the shape of the adhesive layer above. The release layer has a shape of a thin portion outwardly towards the rim that then thickens to a thick portion at the center of the disc.

Upon a user separating the disc 1 from the release layer 78, the adhesive layer 77b bonds releasably to a cap 8 when installed upon a stopper S as previously shown in FIG. 29. Upon removing the preferred embodiment from a stopper cap, the adhesive layer does not leave any residue. The adhesive layer includes solvent acrylics, pressure sensitive adhesives as before. Outwardly from the adhesive layer, that is, beneath it, the disc 1 has the release layer 78, preferably of polyethylene coated paper.

As before, the release layer protects the adhesive layer from premature bonding to an undesired surface or location, such as packaging. The release layer has a plurality of shallow grooves therein where the grooves are mutually parallel. The grooves generally parallel the plane of the top surface.

This alternate embodiment of the invention also has its interfaces between adjacent layers. A first interface 74a' joins the ink layer 75 to the receiving layer 74 and extends at least partially across the receiving layer. A second interface 75a' joins the laminate layer 76 to the ink layer 75 and extends completely across the ink layer. The second interface seals the laminate layer to the ink layer and prevents intrusion of water and other substances into the invention. Beneath the receiving layer, a third interface 77a' denotes a permanent bond of the adhesive layer 77 to the receiving layer. The third interface also extends completely underneath the receiving layer so that the adhesive layer has a full bond to the upper three layers of the invention. And a fourth interface 78a' releasably connects the release layer 78 to the adhesive layer 77 opposite the third interface 77a. The fourth interface denotes a separation surface that appears upon removal of the release layer during installation. The fourth interface then engages the cap 8 of a stopper as previously shown.

More particularly, the first interface 74a' represents the depositing, bonding, or joining of ink from the ink layer 75' to the receiving layer 74'. The first interface identifies where the ink merges with the receiving layer. The second interface 75a' represents the laminate layer 76 as it covers ink or other printing material upon the ink layer 75 and any interstitial spaces between portions of ink, e.g. hollow portions of letters, numerals, characters, and the like. Extending over the ink and interstitial spaces, the second interface identifies where the laminate layer merges with the ink layer and the receiving layer beneath it. The second interface also shows the laminate layer 76' curving downwardly upon the perimeter, similar to an ogee, towards the ink layer 75'. In the direction of the bottom surface and below the receiving layer, the third interface 77a' identifies the permanent bond of the adhesive layer 77' to the receiving layer. The third interface identifies where the adhesive layer knits into the receiving layer so that both layers remain together, before and during usage of the invention. Then beneath the adhesive layer, the fourth interface 78a' shows the joint between the release layer 78' and the adjacent adhesive layer 77'. The fourth interface follows the curved form of the adhesive layer towards the bottom surface. The fourth interface shows the surface from which the release layer separates thus exposing the adhesive layer for securement upon a curved supporting surface.

In this embodiment, the clear laminate 76' and ink layer 75' have a combined curved perimeter edge so that that edge and the receiving layer 74', and adhesive layer 77b have the rim 71 in common. Preferably, the clear laminate extends around the rim for the circumference of the disc. The disc has a full cut that follows a shape, if present, in the ink layer through all of the layers.

From the aforementioned description, a decorative reflective stopper cover has been described. The decorative reflective stopper cover is uniquely capable of reflecting adjacent sink stopper and sink structure. Further, the decorative reflective stopper cover may also secure to a curved cap of a sink stopper. The decorative reflective stopper cover and its various components may be manufactured from many materials, including but not limited to, vinyl, polymers, such as nylon, polypropylene, polyvinyl chloride, high density polyethylene, polypropylene, ferrous and non-ferrous metal foils, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for displaying an image upon a stopper in a sink, said device comprising:
   a top surface and an opposite bottom surface, said top surface being spaced apart and mutually parallel to said bottom surface, said top surface having a perimeter;
   an outer edge extending along the perimeter of said top surface and being generally perpendicular to said top surface and said bottom surface;
   said device having a disc shape, a diameter, and a thickness perpendicular to the diameter, and said outer edge being round;
   said top surface being smooth and transparent and displaying a image thereon;
   said bottom surface adapted to join a supporting surface in a releasable manner;
   said device having a construction of a plurality of layers;
   said plurality of layers including said outer edge;
   wherein said device is water resistant and said top surface is smooth;
   said plurality of layers being capable of immersion in water for a lengthy time; and,
   said top surface having an inherent high gloss.

2. The device for displaying a image of claim 1 further comprising:
   a transparent layer denoting said top surface;
   an ink layer beneath said transparent layer;
   an opaque receiving layer beneath said ink layer; and,
   an adhesive layer beneath said receiving layer; and,
   wherein said transparent layer displays said ink layer to a user and said adhesive layer is adapted to connect said device to a supporting surface releasably.

3. The device for displaying a image of claim 2 wherein said transparent layer has an inherent high gloss and said receiving layer is a smooth vinyl.

4. The device for displaying a image of claim 2 wherein said transparent layer, said ink layer, said receiving layer, and said adhesive layer are kiss cut so that said layers form said outer edge.

5. The device for displaying a image of claim 3 further comprising:
   said transparent layer having a gloss of at least 70 gloss units.

6. The device for displaying a image of claim 5 further comprising:
   said transparent layer having a high coefficient of luminous intensity.

7. The device for displaying a image of claim 3 further comprising:
    said diameter having a ratio to said thickness from about 75 to about 175.
8. The device for displaying a image of claim 7 further comprising:
    said device having a thickness less than 1/80 of an inch.
9. The device for displaying a image of claim 2 further comprising:
    a release layer beneath said adhesive, said release layer is adapted to remove by a user for installation of said device.
10. A device for displaying a image upon a stopper in a sink, said device comprising:
    a top surface and an opposite bottom surface, said top surface being spaced apart and mutually parallel to said bottom surface, said top surface having a perimeter;
    an outer edge extending along the perimeter of said top surface;
    said outer edge being round, said device having a disc shape, a diameter, and a thickness perpendicular to the diameter, said outer edge being perpendicular to said top surface and said bottom surface;
    said top surface being smooth and transparent and displaying a image thereon;
    said bottom surface adapted to join a supporting surface in a releasable manner;
    wherein said device is water resistant and said top surface is smooth;
    said device having a construction of a plurality of layers, said plurality of layers commonly including a transparent layer denoting said top surface, an ink layer beneath said transparent layer, an opaque receiving layer beneath said ink layer and said transparent layer, and an adhesive layer beneath said receiving layer;
    said transparent layer, said ink layer, said receiving layer, and said adhesive layer each having commonly said outer edge, said outer edge being perpendicular to said top surface and said bottom surface;
    said device being capable of immersion in water;
    said top surface and said transparent layer each having an inherent reflective high gloss and said receiving layer being smooth vinyl; and,
    wherein said transparent layer displays said ink layer to a user and said adhesive layer is adapted to connect said bottom surface to a supporting surface releasably.
11. The device for displaying a image of claim 10 wherein said transparent layer, said ink layer, said receiving layer, and said adhesive layer are kiss cut and said layers combine to form said outer edge.
12. The device for displaying a image of claim 10 further comprising:
    said transparent layer having a gloss of at least 70 gloss units.
13. The device for displaying a image of claim 12 further comprising:
    said transparent layer having a high coefficient of luminous intensity.
14. The device for displaying a image of claim 12 further comprising:
    said diameter having a ratio to said thickness from about 75 to about 175.
15. The device for displaying a image of claim 14 further comprising:
    said device having a thickness less than 1/80 of an inch.
16. The device for displaying a image of claim 10 further comprising:
    a release layer beneath said adhesive, said release layer is adapted to remove by a user for installation of said device.
17. The device for displaying a image of claim 10 further comprising:
    said adhesive layer having its thickness beneath said receiving layer and a concave shape wherein its thickness is thin near the center of said adhesive layer and its thickness is large near the outer edge of said device.
18. The device for displaying a image of claim 17 further comprising:
    a release layer beneath said adhesive, said release layer having its thickness beneath said adhesive layer and a convex shape wherein its thickness is thin near the outer edge of said device and its thickness is large near the center of said release layer, and said release layer having a plurality of mutually parallel grooves thereon generally parallel to said top surface; and,
    said release layer is adapted to remove by a user for installation of said device.
19. A device displaying image, said device comprising:
    a top surface and an opposite bottom surface, said top surface being spaced apart and mutually parallel to said bottom surface, said top surface having a perimeter;
    an outer edge extending along the perimeter of said top surface;
    said outer edge being round, said device having a disc shape, said outer edge being perpendicular to said top surface and said bottom surface;
    said top surface being smooth and transparent and displaying a image thereon;
    said bottom surface adapted to join a supporting surface in a releasable manner;
    wherein said device is water resistant and said top surface is smooth;
    said device having a diameter and a thickness perpendicular to the diameter extending between said top surface and said bottom surface, the diameter of said device having a ratio to said thickness from about 75 to about 175, more preferably the diameter of said device being from about 0.75 inch to about 1.75 inch and said thickness being less than about 1/80 inch;
    said device having a construction of a plurality of layers, said plurality of layers including a transparent layer denoting said top surface, an ink layer beneath said transparent layer, an opaque receiving layer beneath said ink layer, and an adhesive layer beneath said receiving layer;
    said transparent layer, said ink layer, said receiving layer, and said adhesive layer combining to form said outer edge, said outer edge being perpendicular to said top surface and said bottom surface;
    said device being capable of immersion in water;
    said top surface and said transparent layer each having an inherent high gloss and said receiving layer being smooth vinyl; and,
    wherein said transparent layer displays said ink layer to a user and said adhesive layer is adapted to connect said bottom surface to a supporting surface releasably.
20. The device displaying image of claim 19, further comprising:
    said transparent layer, said ink layer, said receiving layer, and said adhesive layer each having kiss cut; and,
    a release layer beneath said adhesive, said release layer is adapted to remove by a user for installation of said device upon a sink stopper.

* * * * *